US012205527B2

(12) United States Patent
Zhou et al.

(10) Patent No.: US 12,205,527 B2
(45) Date of Patent: Jan. 21, 2025

(54) DISPLAY PANEL AND METHOD FOR DRIVING THE SAME, AND DISPLAY APPARATUS

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Xingyao Zhou, Wuhan (CN); Yana Gao, Wuhan (CN); Kang Yang, Wuhan (CN); Wei Liu, Wuhan (CN); Qijun Yao, Wuhan (CN)

(73) Assignees: WUHAN TIANMA MICRO-ELECTRONICS CO., LTD. SHANGHAI BRANCH, Shanghai (CN); WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/077,849

(22) Filed: Dec. 8, 2022

(65) Prior Publication Data

US 2023/0098040 A1 Mar. 30, 2023

(30) Foreign Application Priority Data

Aug. 30, 2022 (CN) ......................... 202211044580.5

(51) Int. Cl.
*G09G 3/32* (2016.01)

(52) U.S. Cl.
CPC ....... *G09G 3/32* (2013.01); *G09G 2310/0286* (2013.01); *G09G 2310/0294* (2013.01);
(Continued)

(58) Field of Classification Search
CPC ............. G09G 3/32; G09G 2310/0286; G09G 2310/0294; G09G 2310/061; G09G 2320/0247; G09G 2330/021
See application file for complete search history.

(56) References Cited

U.S. PATENT DOCUMENTS 7,180,486 B2 * 2/2007 Jeong .................. G09G 3/3233 345/82
8,358,299 B2 * 1/2013 Chaji .................. G09G 3/3283 345/211
(Continued)

FOREIGN PATENT DOCUMENTS

CN 108227192 A 6/2018
CN 113012643 A 6/2021
(Continued)

OTHER PUBLICATIONS

Chinese Office Action mailed Oct. 15, 2024, issued in related Chinese Application No. 202211044580.5 filed Aug. 30, 2022, 29 pages.

*Primary Examiner* — Michael J Jansen, II
(74) *Attorney, Agent, or Firm* — Christensen O'Connor Johnson Kindness PLLC

(57) ABSTRACT

A display panel has a non-display area and a display area including first and second display areas. The display panel includes pixel circuits located in the display area, and driving circuits located in the non-display area. Each pixel circuit includes a driving transistor and a first transistor electrically connected to a gate of the driving transistor. The pixel circuits include first pixel circuits electrically connected to pixels located in the first display area and second pixel circuits electrically connected to pixels located in the second display area. A gate of the first transistor in the first
(Continued)

pixel circuit and a gate of the first transistor in the second pixel circuit are coupled to different driving circuits.

20 Claims, 20 Drawing Sheets

(52) U.S. Cl.
CPC ................. *G09G 2310/061* (2013.01); *G09G 2320/0247* (2013.01); *G09G 2330/021* (2013.01)

(56) References Cited

U.S. PATENT DOCUMENTS 8,587,578 B2 * 11/2013 Choi ..................... H05B 45/60 315/169.3
8,686,926 B2 * 4/2014 Han ..................... G09G 3/3233 345/82
9,001,009 B2 * 4/2015 Choi ..................... G09G 3/325 345/76
9,337,439 B2 * 5/2016 Kwon ..................... G09G 3/3258
9,564,083 B2 * 2/2017 Bae ..................... G09G 3/3266
9,748,321 B2 * 8/2017 Kim ..................... H10K 59/1213
9,786,224 B2 * 10/2017 Kim ..................... G09G 3/3258
9,842,543 B2 * 12/2017 Zhou ..................... G09G 3/3258
9,947,269 B2 * 4/2018 Jung ..................... G09G 3/3233
10,074,710 B2 * 9/2018 Ebisuno ..................... H10K 59/1213
10,242,620 B2 * 3/2019 Zhu ..................... G09G 3/3258
10,276,092 B2 * 4/2019 Oh ..................... G09G 3/3283
10,431,153 B2 * 10/2019 Gao ..................... G09G 3/3225
10,614,765 B2 * 4/2020 Kim ..................... G09G 5/14
10,700,146 B2 * 6/2020 Chai ..................... H10K 59/12
10,762,850 B2 * 9/2020 Choi ..................... H04N 13/356
10,777,128 B2 * 9/2020 Feng ..................... H10K 10/482
10,789,881 B2 * 9/2020 Park ..................... G09G 3/3225
10,796,625 B2 * 10/2020 Zhou ..................... G09G 3/22
10,796,642 B2 * 10/2020 Choi ..................... G09G 3/3266
10,825,391 B2 * 11/2020 Nam ..................... G09G 3/3233
10,861,918 B2 * 12/2020 Jeon ..................... H01L 27/1259
10,872,570 B2 * 12/2020 Kim ..................... G09G 3/3233
10,923,506 B2 * 2/2021 Park ..................... H01L 27/1225
10,943,528 B2 * 3/2021 Zhou ..................... G09G 3/32
10,978,537 B2 * 4/2021 Ebisuno ..................... H10K 59/131
11,018,167 B2 * 5/2021 Zhao ..................... H10K 59/12
11,056,049 B2 * 7/2021 Kim ..................... G09G 3/3233
11,211,008 B2 * 12/2021 Park ..................... G09G 3/2007
11,315,457 B2 * 4/2022 Kwon ..................... G09G 3/3266
11,335,757 B2 * 5/2022 Kim ..................... H10K 59/126
11,355,064 B2 * 6/2022 Jeon ..................... G09G 3/3233
11,373,578 B2 * 6/2022 Ka ..................... G09G 3/3266
11,393,399 B2 * 7/2022 Na ..................... G09G 3/3233
11,404,522 B2 * 8/2022 Yun ..................... H10K 59/1213
11,410,602 B2 * 8/2022 Kim ..................... G09G 3/3233
11,410,607 B2 * 8/2022 Roh ..................... G09G 3/3266
11,443,687 B2 * 9/2022 Son ..................... G09G 3/32
11,462,152 B2 * 10/2022 Kim ..................... G09G 3/32
11,538,399 B2 * 12/2022 Li ..................... G09G 3/32
11,580,906 B2 * 2/2023 Wang ..................... G09G 3/2003
11,610,538 B2 * 3/2023 Park ..................... G09G 3/3233
11,676,536 B2 * 6/2023 Chae ..................... G09G 3/3233 345/204
11,705,066 B2 * 7/2023 Kang ..................... G09G 3/3233 345/211
11,715,422 B2 * 8/2023 Kim ..................... G09G 3/3266 345/204
11,783,772 B2 * 10/2023 Gu ..................... G09G 3/3266 345/206
11,798,465 B2 * 10/2023 Kim ..................... G09G 3/32
11,804,171 B2 * 10/2023 Park ..................... G09G 3/32
11,996,027 B2 * 5/2024 Zhou ..................... G09G 3/3233
12,080,242 B2 * 9/2024 Jeong ..................... G09G 3/3266
2010/0207920 A1 * 8/2010 Chaji ..................... G09G 3/3233 345/76
2011/0157125 A1 * 6/2011 Choi ..................... G09G 3/3233 315/160
2012/0113070 A1 * 5/2012 Wang ..................... G09G 3/3677 345/204
2015/0154902 A1 * 6/2015 Lee ..................... G09G 3/20 345/213
2017/0352328 A1 * 12/2017 Jeong ..................... G09G 5/10
2018/0130410 A1 * 5/2018 Gao ..................... G09G 3/3225
2018/0158409 A1 * 6/2018 Byun ..................... G09G 3/3208
2018/0197480 A1 * 7/2018 Choi ..................... H04N 13/356
2018/0197481 A1 * 7/2018 Choi ..................... G09G 3/3266
2018/0197482 A1 * 7/2018 Choi ..................... G09G 3/3266
2018/0322831 A1 * 11/2018 Kim ..................... G09G 3/3266
2019/0066598 A1 * 2/2019 Kim ..................... G09G 3/3233
2020/0243016 A1 * 7/2020 Park ..................... G09G 3/3258
2020/0394961 A1 * 12/2020 Kim ..................... G09G 3/3291
2021/0027696 A1 * 1/2021 Kim ..................... G09G 3/3233
2021/0035488 A1 * 2/2021 Seo ..................... G09G 3/2092
2021/0193020 A1 * 6/2021 Ka ..................... G09G 3/3266
2021/0280130 A1 * 9/2021 Wang ..................... G09G 3/3233
2021/0366397 A1 * 11/2021 Na ..................... G09G 3/3258
2021/0375193 A1 * 12/2021 Son ..................... G09G 3/3233
2022/0020303 A1 * 1/2022 Kwon ..................... G09G 3/3266
2022/0028329 A1 * 1/2022 Kim ..................... G09G 3/3233
2022/0028333 A1 * 1/2022 Jeong ..................... G09G 3/3266
2022/0122522 A1 * 4/2022 Li ..................... G09G 3/2092
2022/0270542 A1 * 8/2022 Park ..................... G09G 3/32
2022/0358884 A1 * 11/2022 Chae ..................... G09G 3/3233
2023/0027673 A1 * 1/2023 Jeong ..................... G09G 3/3266
2023/0099387 A1 * 3/2023 Park ..................... G09G 3/32
2023/0108865 A1 * 4/2023 Kim ..................... G09G 3/3233 345/55
2023/0141543 A1 * 5/2023 Gu ..................... G11C 19/287 345/206
2023/0154403 A1 * 5/2023 Kang ..................... H10K 59/1216 345/211
2023/0157073 A1 * 5/2023 Kim ..................... H10K 59/1216 257/40
2023/0162664 A1 * 5/2023 Kim ..................... G09G 3/32 345/55
2023/0206855 A1 * 6/2023 Park ..................... H10K 59/131 345/100
2023/0290308 A1 * 9/2023 Chae ..................... G09G 3/3275 345/204
2023/0298531 A1 * 9/2023 Huang ..................... G09G 3/3266 345/694
2023/0306905 A1 * 9/2023 Park ..................... G09G 3/3233 345/690
2023/0316976 A1 * 10/2023 Zhou ..................... G09G 3/3233 345/212
2023/0320154 A1 * 10/2023 Kim ..................... H10K 59/1213 257/40
2023/0335058 A1 * 10/2023 Cho ..................... G09G 3/3233
2023/0343295 A1 * 10/2023 Yang ..................... G09G 3/3275

FOREIGN PATENT DOCUMENTS

CN 113936607 A 1/2022
CN 114005411 A 2/2022
CN 115311980 A 11/2022

* cited by examiner

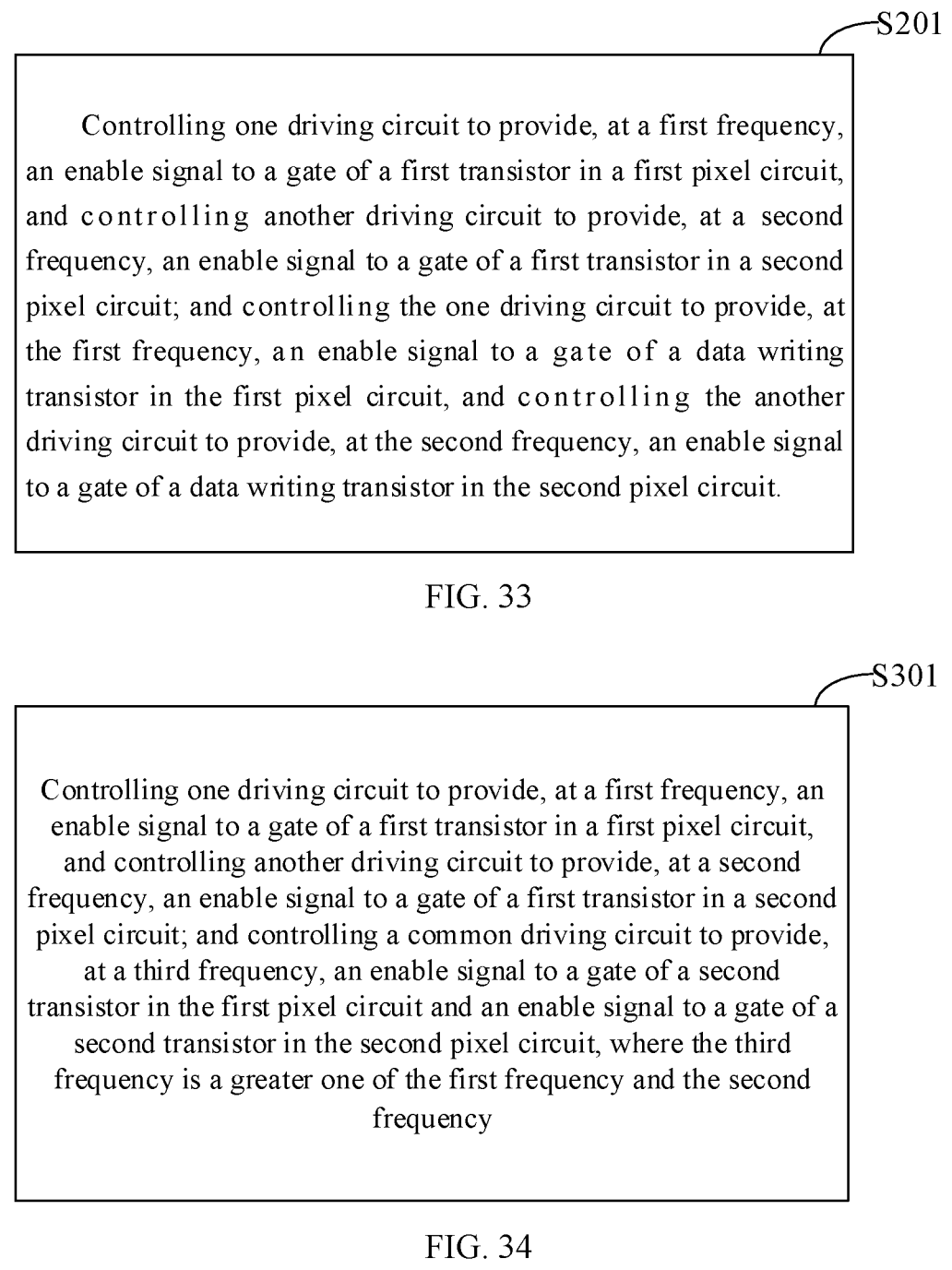

S201

Controlling one driving circuit to provide, at a first frequency, an enable signal to a gate of a first transistor in a first pixel circuit, and controlling another driving circuit to provide, at a second frequency, an enable signal to a gate of a first transistor in a second pixel circuit; and controlling the one driving circuit to provide, at the first frequency, an enable signal to a gate of a data writing transistor in the first pixel circuit, and controlling the another driving circuit to provide, at the second frequency, an enable signal to a gate of a data writing transistor in the second pixel circuit.

FIG. 33

S301

Controlling one driving circuit to provide, at a first frequency, an enable signal to a gate of a first transistor in a first pixel circuit, and controlling another driving circuit to provide, at a second frequency, an enable signal to a gate of a first transistor in a second pixel circuit; and controlling a common driving circuit to provide, at a third frequency, an enable signal to a gate of a second transistor in the first pixel circuit and an enable signal to a gate of a second transistor in the second pixel circuit, where the third frequency is a greater one of the first frequency and the second frequency

FIG. 34

DISPLAY PANEL AND METHOD FOR DRIVING THE SAME, AND DISPLAY APPARATUS

CROSS-REFERENCE TO RELATED APPLICATIONS

The present application claims priority to Chinese Patent Application No. 202211044580.5, filed on Aug. 30, 2022, the content of which is incorporated herein by reference in its entirety.

TECHNICAL FIELD

The present disclosure relates to the technical field of displaying, and in particular to a display panel, a method for driving a display panel, and a display apparatus.

BACKGROUND

Dynamic variable frequency technology has been employed in the display products in the related art. Dynamic variable frequency technology refers to changing a display scanning frequency of the entire display panel in different application scenarios. For example, a high scanning frequency is used to display dynamic images such as a game screen, which can ensure clear and smooth display of dynamic images. A low scanning frequency is used to display slow motion or static images, which can reduce power consumption. The application of dynamic variable frequency technology can reduce power consumption. There is still a very high demand for reducing power consumption for future products, and the technologies that can reduce power consumption are still constantly updated.

SUMMARY

In a first aspect, some embodiments of the present disclosure provide a display panel. The display panel has a display area and a non-display area, and the display area includes a first display area and a second display area. The display panel includes pixel circuits located in the display area and at least two driving circuits located in the non-display area. Each of the pixel circuits includes a driving transistor and at least one first transistor. The at least one first transistor is electrically connected to a gate of the driving transistor. The pixel circuits include first pixel circuits electrically connected to pixels located in the first display area and second pixel circuits electrically connected to pixels located in the second display area, and a gate of one first transistor of the at least one first transistor in one first pixel circuit of the first pixel circuits and a gate of one first transistor of the at least one first transistor in one second pixel circuit of the second pixel circuits are coupled to different driving circuits of the at least two driving circuits.

In a second aspect, some embodiments of the present disclosure provide a display apparatus, and the display apparatus includes a display panel. The display panel has a display area and a non-display area, and the display area includes a first display area and a second display area. The display panel includes pixel circuits located in the display area and at least two driving circuits located in the non-display area. Each of the pixel circuits includes a driving transistor and at least one first transistor. The at least one first transistor is electrically connected to a gate of the driving transistor. The pixel circuits include first pixel circuits electrically connected to pixels located in the first display area and second pixel circuits electrically connected to pixels located in the second display area, and a gate of one first transistor of the at least one first transistor in one first pixel circuit of the first pixel circuits and a gate of one first transistor of the at least one first transistor in one second pixel circuit of the second pixel circuits are coupled to different driving circuits of the at least two driving circuits.

In a third aspect, some embodiments of the present disclosure provide a method for driving a display panel. The display panel has a display area and a non-display area, and the display area includes a first display area and a second display area. The display panel includes pixel circuits located in the display area and at least two driving circuits located in the non-display area. Each of the pixel circuits includes a driving transistor and at least one first transistor. The at least one first transistor is electrically connected to a gate of the driving transistor. The pixel circuits include first pixel circuits electrically connected to pixels located in the first display area and second pixel circuits electrically connected to pixels located in the second display area, and a gate of one first transistor of the at least one first transistor in one first pixel circuit of the first pixel circuits and a gate of one first transistor of the at least one first transistor in one second pixel circuit of the second pixel circuits are coupled to different driving circuits of the at least two driving circuits. The method includes controlling the display panel to operate in a display mode where the display panel operates at different frequencies. The controlling the display panel to operate in the display mode where the display panel operates at different frequencies includes: controlling one driving circuit of the at least two driving circuits to provide, at a first frequency, an enable signal to the gate of the one first transistor in the one first pixel circuit; and controlling another driving circuit of the at least two driving circuits to provide, at a second frequency, an enable signal to the gate of the one first transistor in the one second pixel circuit, wherein the first frequency is different from the second frequency.

BRIEF DESCRIPTION OF DRAWINGS

In order to clearly explain technical solutions of embodiments of the present disclosure, the drawings of the embodiments are briefly described as below. The drawings described below are merely some of the embodiments of the present disclosure. Those skilled in the art can obtain other drawings from these drawings.

FIG. 33 is another flow chart of a method for driving a display panel according to some embodiments of the present disclosure;

FIG. 34 is another flow chart of a method for driving a display panel according to some embodiments of the present disclosure.

DESCRIPTION OF EMBODIMENTS

To clarify objectives, technical solutions, and advantages of embodiments of the present disclosure, the technical solutions in the embodiments of the present disclosure will be described clearly and completely in conjunction with the drawings in the embodiments of the present disclosure. The embodiments described are a part, but not all, of the embodiments of the present disclosure. Based on the embodiments of the present disclosure, other embodiments obtained by those of ordinary skill in the art fall within the protection scope of the present disclosure.

Various modifications and changes can be made to the present disclosure without departing from the scope of the disclosure, which are obvious to those skilled in the art. Therefore, the present disclosure covers the modifications and changes of the present disclosure that fall within the scope of the corresponding claims (claimed technical solutions) and their equivalents. It should be noted that the embodiments in the present disclosure can be combined mutually in the case of no conflict.

The terms used in the embodiments of the present disclosure are merely for the purpose of describing specific embodiments, but not intended to limit the present disclosure. The singular forms of "a", "an" and "the" used in the embodiments of the present disclosure and the appended claims are also intended to indicate plural forms, unless clearly indicating others.

A split-screen display technology will be realized in the medium-sized display products. Split-screen display refers to different areas having different display refresh frequencies. One area is configured to display videos and games at high refresh frequencies, and another area is configured to display keyboard and time at low refresh frequencies. In this way, the split-screen display can reduce power consumption. However, the dynamic variable frequency technology in the related art changes the display scanning frequency of the entire display panel, and cannot realize frequency changing in a local part of the display area. Based on these problems in the related art, embodiments of the present disclosure provide a display panel capable of realizing a display mode where different areas of the display panel display images at different frequencies, so as to reduce display power consumption.

Figure 1:
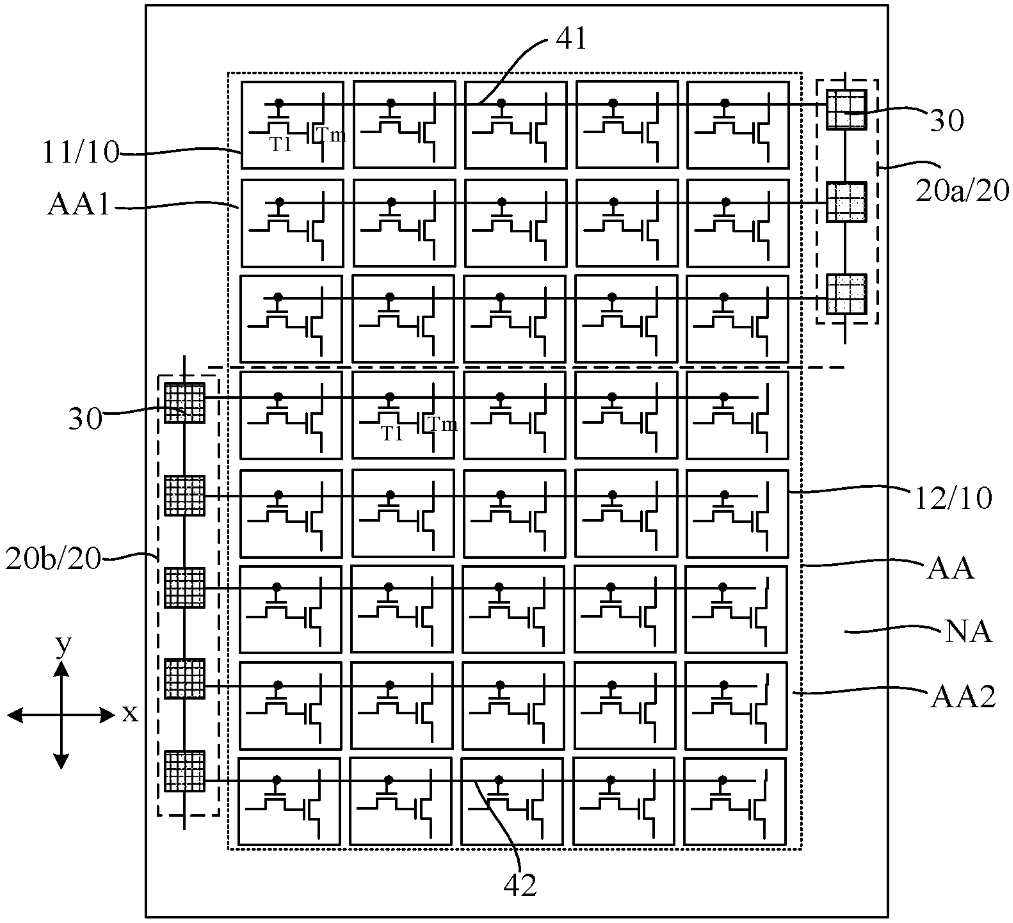
FIG. 1 is a schematic diagram of a display panel according to some embodiments of the present disclosure.
Figure 2:
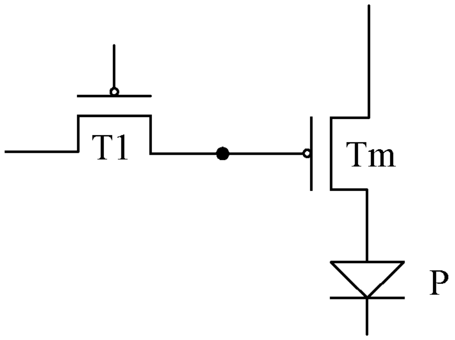
FIG. 2 is a simplified schematic diagram of a pixel circuit in a display panel according to some embodiments of the present disclosure.

FIG. 1 is a schematic diagram of a display panel according to some embodiments of the present disclosure. FIG. 2 is a simplified schematic diagram of a pixel circuit in a display panel according to some embodiments of the present disclosure.

As shown in FIG. 1, the display panel has a display area AA and a non-display area NA. The display area AA includes a first display area AA1 and a second display area AA2. The display panel includes pixel circuits 10 located in the display area. The pixel circuit 10 is configured to drive a pixel (a light-emitting element) in the display area AA to emit light. The light-emitting elements are not shown in FIG. 1. In some embodiments of the present disclosure, the light-emitting elements can be organic light-emitting diodes or inorganic light-emitting diodes. The pixel circuits 10 can include a first pixel circuit 11 and a second pixel circuit 12. The first pixel circuit 11 is electrically connected to a pixel located in the first display area A11, and the second pixel circuit 12 is electrically connected to a pixel located in the second display area A12. That is, the first pixel circuit 11 is configured to drive the first display area AA1 to display images, and the second pixel circuit 12 is configured to drive the second display area AA2 to display image. The pixel circuits 10 in FIG. 1 are all illustrated with blocks. FIG. 1 merely illustrates an example that the first pixel circuit 11 is located in the first display area AA1 and the second pixel circuit 12 is located in the second display area AA2.

As shown in FIG. 2, the pixel circuit 10 includes a driving transistor Tm and a first transistor T1. The driving transistor Tm includes a gate, a first electrode, and a second electrode. The first transistor T1 is electrically connected to the gate of the driving transistor Tm. The gate of the driving transistor Tm is a control terminal of the driving transistor Tm. One of the first electrode and the second electrode of the driving transistor Tm is a source, and the other one of the first electrode and the second electrode is a drain. The driving circuit Tm is configured to generate a driving current under the control of the voltage of its gate. The driving transistor Tm is electrically connected to a light-emitting element P and is configured to provide the driving current to the light-emitting element P to control the light-emitting element P to emit light.

As shown in FIG. 1, the display panel includes at least two driving circuits 20 located in the non-display area NA. The driving circuit 20 can include shift registers 30 that are cascaded. The shift register 30 is any structure configured to shift signals. The display panel can also include driving signal lines configured to control the shift registers 30 to operate. The control signal lines can include a start signal line, a clock signal line, and a power supply signal line. The driving circuit 20 is controlled to operate by the driving signal lines, such that the cascaded shift registers 30 in the driving circuit 20 outputs an enable signal sequentially, and the enable signal can control the operating state of the transistors coupled to the shift registers 30.

The gate of the first transistor T1 in the first pixel circuit 11 and the gate of the first transistor T1 in the second pixel circuit 12 that has function corresponding to the first transistor T1 in the first pixel circuit 11 are coupled to different driving transistors 20. FIG. 1 shows a driving circuit 20*a* and a driving circuit 20*b*. The gate of the first transistor T1 in the first pixel circuit 11 is coupled to the driving circuit 20*a*, and the gate of the first transistor T1 in the second pixel circuit 12 is coupled to the driving circuit 20*b*. That is, an on-off state of the first transistor T1 in the first pixel circuit 11 and an on-off state of the first transistor T1 in the second pixel circuit 12 can be independently controlled. According to different display modes, the turning-on frequency of the first transistor T1 in the first pixel circuit 11 and the turning-on frequency of the first transistor T1 in the second pixel circuit 12 can be the same or different from each other.

In an operating cycle of the pixel circuit 10, after a data voltage is written to the gate of the driving transistor Tm, the driving transistor Tm generates the driving current under the control of the voltage of the gate. An image refresh frequency of the display area where the pixel circuits 10 are located can be the same as a changing frequency of a potential of the gate of the driving transistor Tm.

In some embodiments, the operating cycle of the pixel circuit 10 includes a data writing phase and a light-emitting phase. During the data writing phase, the data voltage is written to the gate of the driving transistor Tm. During the light-emitting phase, the driving transistor Tm generates the driving current under the control of the voltage of the gate, and the image refresh frequency of the display area can be the same as the frequency at which the data voltage is written to the gate of the driving transistor Tm.

In some other embodiments, the operating cycle of the pixel circuit 10 also includes a reset phase. During the reset phase, the gate of the driving transistor Tm is reset. As a result, the voltage of the gate of the driving transistor Tm is changed during the reset phase. The image refresh frequency of the display panel can be equal to the frequency of resetting the gate of the driving transistor Tm, and equal to the frequency of writing the data voltage to the gate of the driving transistor Tm.

In some embodiments, the first transistor T1 is electrically connected to the gate of the driving transistor Tm, and thus the first transistor T1 can change the potential of the gate of the driving transistor Tm. Since the gate of the first transistor T1 in the first pixel circuit 11 and the gate of the first transistor T1 in the second pixel circuit 12 are coupled to different driving circuits 20, the potential of the gate of the driving transistor Tm in the first pixel circuit 11 and the potential of the gate of the driving transistor Tm in the second pixel circuit 12 can be controlled independently, and the image refresh frequency of the first display area AA1 and the image refresh frequency of the second display area AA2 can be different from each other. In the embodiments of the present disclosure, the image refresh frequency of the first display area AA1 and the image refresh frequency of the second display area AA2 can be controlled to be different from each other according to display needs. For example, a high refresh frequency is applied to an area displaying dynamic images such as videos and games, and a low refresh frequency is applied to an image displaying slow motion images or static images (such as keyboard and time), which realizes that different areas of the display panel display images at different frequencies, thereby reducing the display power consumption.

As shown in FIG. 1, the pixel circuits 10 in the display area AA are arranged in a first direction x to form a pixel circuit row. A first signal line 41 is provided in the first display area AA1 and coupled to the shift register 30 of the driving circuit 20*a*. The first transistor T1 in the first pixel circuit 11 is coupled to the driving circuit 20*a* through the first signal line 41. A second signal line 42 is provided in the second display area AA2 and coupled to the shift register 30 of the driving circuit 20*b*. The first transistor T1 in the second pixel circuit 12 is coupled to the driving circuit 20*b* through the second signal line 42. When the display panel displays an image, the cascaded shift registers 30 in the driving circuit 20*a* sequentially output the enable signal, and the enable signal is transmitted to the gates of the first transistors T1 through the first signal lines 41; and the cascaded shift registers 30 in the driving circuit 20*b* sequentially output the enable signal, and the enable signal is transmitted to the gates of the first transistors T1 through the second signal lines 42.

In some embodiments of the present disclosure, the display panel has a first operating mode, a second operating mode, and a third operating mode. The first operating mode and the second operating mode each are a display mode where the display panel displays an image at different frequencies. In the first operating mode or the second operating mode, the image refresh frequency of the first display area AA1 is different from the image refresh frequency of the second display area AA2. In some embodiments, in the first operating mode, the image refresh frequency of the first display area AA1 is smaller than the image refresh frequency of the second display area AA2; in the second operating mode, the image refresh frequency of the first display area AA1 is greater than the image refresh frequency of the second display area AA2; and in the third operating mode, the image refresh frequency of the first display area AA1 is equal to the image refresh frequency of the second display area AA2. The following embodiments in which the image refresh frequency of the first display area AA1 is different from the image refresh frequency of the second display area AA2 are depicted with an example where the image refresh frequency of the first display area AA1 is smaller than the image refresh frequency of the second display area AA2 in the first operating mode.

Figure 3:
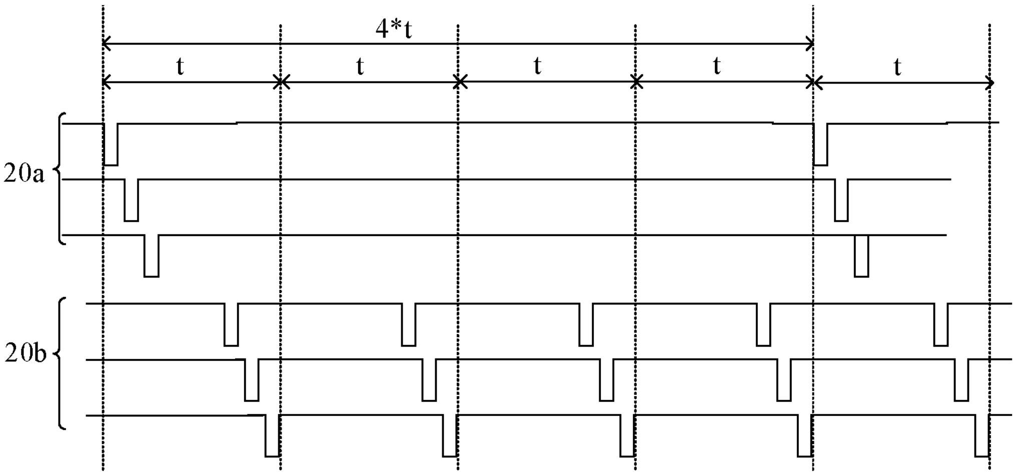
FIG. 3 is a timing sequence of a driving circuit in a display panel according to some embodiments of the present disclosure.

FIG. 3 is a timing sequence of a driving circuit in a display panel according to some embodiments of the present disclosure. Taking the enable signal for controlling the first transistor T1 to be turned on being a level signal as an example, FIG. 3 illustrates the timing sequences of the enable signals that are sequentially outputted by three cascaded shift registers 30 in the driving circuit 20*a*, and the timing sequences of the enable signals that are sequentially outputted by three cascaded shift registers 30 in the driving circuit 20*b*. In FIG. 3, t is a cycle for the shift register 30 in the driving circuit 20*b* to provide the enable signal, and t also can be regarded as the data writing cycle of the second pixel circuit 12. As show in FIG. 3, a frequency at which the shift register 30 in the driving circuit 20*a* provides the enable signals is smaller than a frequency at which the shift register 30 in the driving circuit 20*b* provides the enable signal. That is, the driving circuit 20*a* provides a first enable signal, the driving circuit 20*b* provides a second enable signal, and a frequency of the first enable signal is smaller than a frequency of the second enable signal.

The first transistor T1 in the first pixel circuit 11 is turned on under the control of the first enable signal, such that the potential of the gate of the driving transistor Tm is changed. The first transistor T2 in the second pixel circuit 12 is turned on under the control of the second enable signal, such that the potential of the gate of the driving transistor Tm is changed. The frequency of the first enable signal is smaller than the frequency of the second enable signal, such that the image refresh frequency of the first display area AA1 is smaller than the image refresh frequency of the second display area AA2, thereby realizing that the first display area AA1 and the second display area AA2 display images at different frequencies.

As shown in the timing sequence of FIG. 3, the cycle of the first enable signal provided by the driving circuit 20*a* is four times the cycle of the second enable signal provided by the driving circuit 20*b*, and accordingly, the frequency at which the first enable signal is provided by the driving circuit 20*a* is a quarter of the frequency at which the second enable signal is provided by the driving circuit 20*b*. Correspondingly, for example, the frequency at which the data voltage is written to the gate of the driving transistor Tm in the second pixel circuit 12 can be four times the frequency at which the data voltage is written to the gate of the driving transistor Tm in the first pixel circuit 11, and the image refresh frequency of the second display area AA2 can be four times the image refresh frequency of the first display area AA1. When the image refresh frequency of the second display area AA2 is 120 Hz, the image refresh frequency of the first display area AA1 is 30 Hz.

In other embodiments, the frequency at which the first enable signal is provided by the driving circuit 20*a* is 1 Hz, the frequency at which the second enable signal is provided by the driving circuit 20*b* is 120 Hz. In this way, the image refresh frequency of the first display area AA1 is 1 Hz, and the image refresh frequency of the second display area AA2 is 120 Hz. That is, the first display area AA1 is refreshed at a low frequency, and the second display area AA2 is refreshed at a high frequency, so that different areas of the display panel display images at different frequencies.

Figure 4:
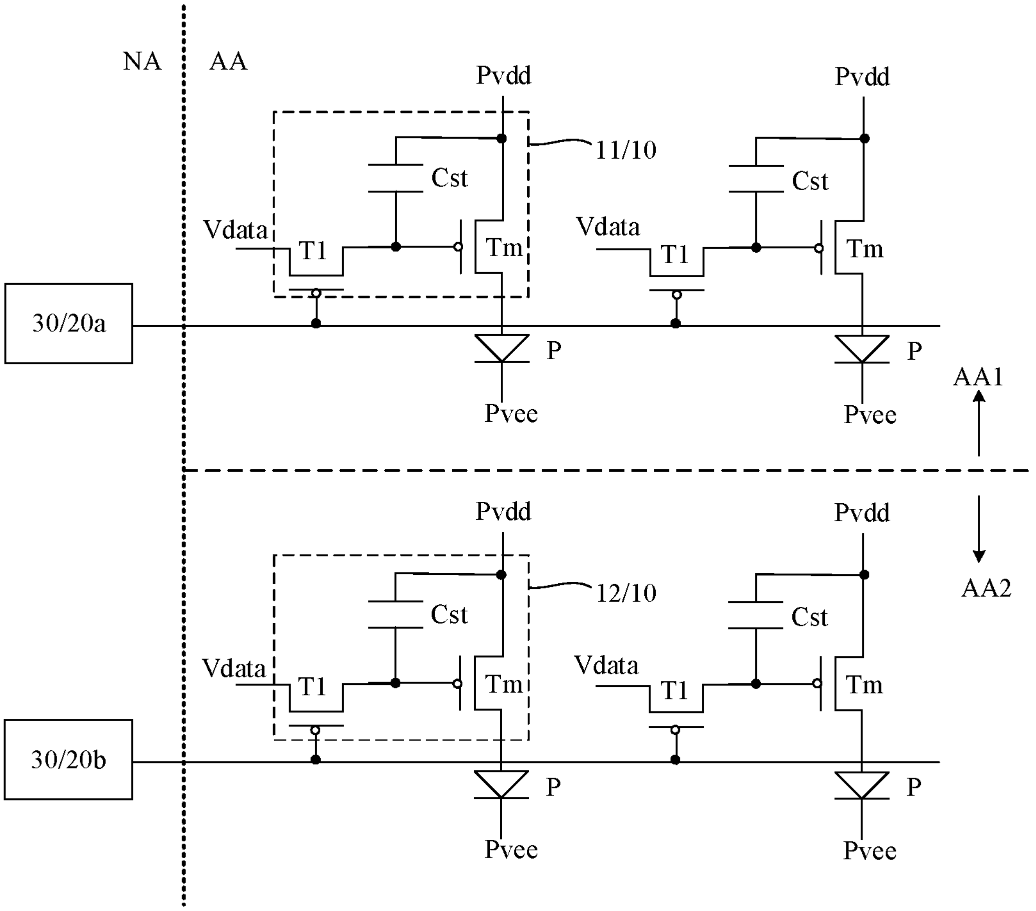
FIG. 4 is a schematic diagram of a local circuit of a display panel according to some embodiments of the present disclosure.
Figure 5:
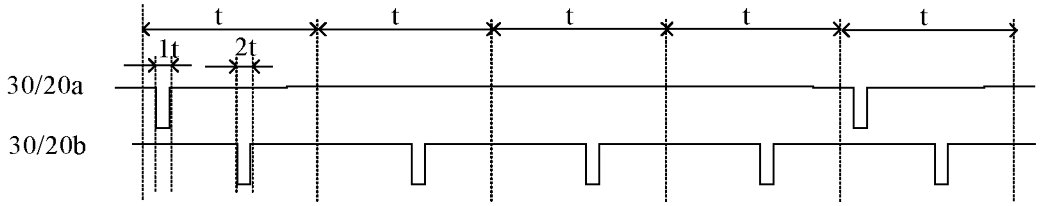
FIG. 5 is a timing sequence of a display panel shown in FIG. 4 according to some embodiments of the present disclosure.

FIG. 4 is a schematic diagram of a local circuit in a display panel according to some embodiments of the present disclosure. FIG. 5 is a timing sequence of the display panel shown in FIG. 4 according to some embodiments of the present disclosure. In some embodiments, as shown in FIG. 4, the first transistor T1 includes a data writing transistor, a first electrode of the first transistor T1 is configured to receive a data signal Vdata, a second electrode of the first transistor T1 is coupled to the gate of the driving transistor Tm, and the first transistor T1 is configured to write the data voltage to the gate of the driving transistor Tm after the first transistor T1 is turned on. The pixel circuit can also include a storage capacitor Cst. A first electrode plate of the storage capacitor Cst and the first electrode of the driving transistor Tm are both configured to receive a positive power supply signal Pvdd, and a second electrode plate of the storage capacitor Cst is coupled to the gate of the driving transistor Tm. A second electrode of the driving transistor Tm is coupled to a first electrode of the light-emitting element P, and a second electrode of the light-emitting element P is configured to receive a negative power supply signal Pvee. The gate of the first transistor T1 in the first pixel circuit 11 is coupled to the shift register 30 in the driving circuit 20*a*, and the gate of the first transistor T1 in the second pixel circuit 12 is coupled to the shift register 30 in the driving circuit 20*b*. The first transistor T1 of the pixel circuit 10 in the first pixel circuit 11 and the first transistor T1 of the pixel circuit 10 in the second pixel circuit 12 are coupled to different driving transistors 20. In this way, the data writing process of the first pixel circuit 11 and the data writing process of the second pixel circuit 12 can be controlled independently of each other. When the frequency of the enable signal provided by the driving circuit 20*a* is different from the frequency of the enable signal provided by the driving circuit 20*b*, the data writing frequency of the first pixel circuit 11 is different from the data writing frequency of the second pixel circuit 12, and the image refresh frequency of the first display area AA1 is different from the image refresh frequency of the second display area AA2, which achieves that different areas of the display panel display images at different frequencies, thereby reducing the power consumption.

FIG. 5 shows an example in which the frequency at which the enable signal is provided by the driving circuit 20*a* is smaller than the frequency at which the enable signal is provided by the driving circuit 20*b*. As shown in FIG. 5, t is a cycle for the shift register 30 in the driving circuit 20*b* to provide the enable signal. In the operating process of the first pixel circuit 11, a phase 1*t* is a data writing phase of the first pixel circuit 11. During the phase 1*t*, the first transistor T1 is turned on and then the data voltage is written to the gate of the driving transistor Tm. In the operating process of the second pixel circuit 12, a phase 2*t* is a data writing phase of the second pixel circuit 12. During the phase 2*t*, the first transistor T1 is turned on and then a data voltage is written to the gate of the driving transistor Tm. The display panel is driven with the timing sequence shown in FIG. 5, which can achieve that the image refresh frequency of the first display area AA1 is smaller than the image refresh frequency of the second display area AA2.

As shown in FIG. 4, the transistors of the pixel circuit are p-type transistors. In other embodiments, the transistors of the pixel circuit are n-type transistors.

Figure 6:
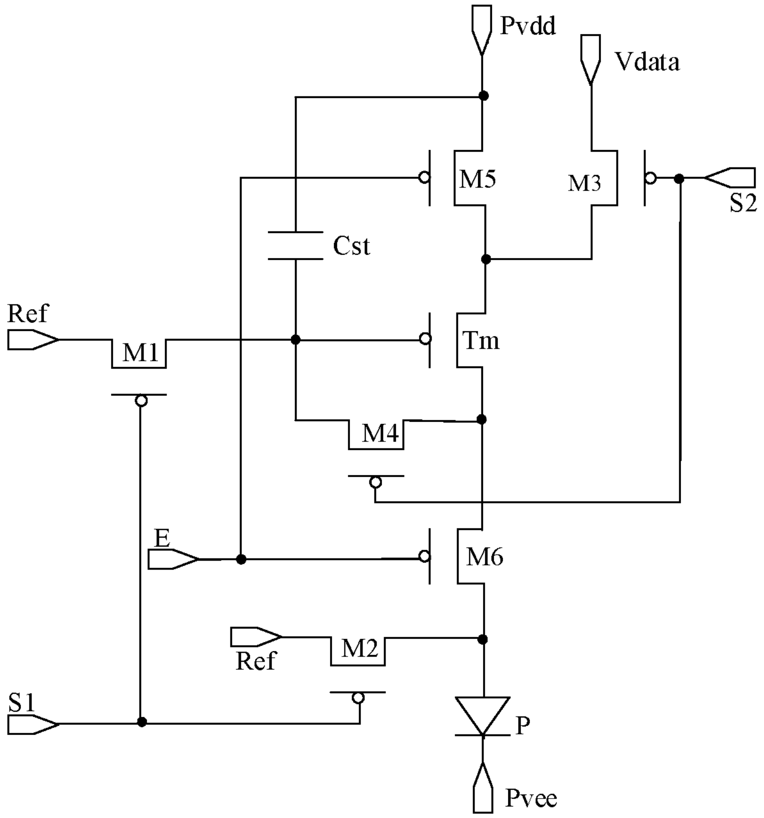
FIG. 6 is a schematic diagram of a pixel circuit in a display panel according to some embodiments of the present disclosure.
Figure 7:
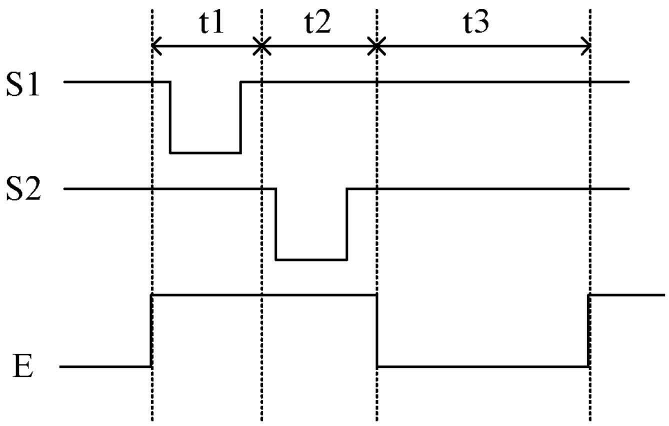
FIG. 7 is a timing sequence of a display panel shown in FIG. 6 according to some embodiments of the present disclosure.

FIG. 6 is a schematic diagram of a pixel circuit in a display panel according to some embodiments of the present disclosure. FIG. 7 is a timing sequence of the display panel shown in FIG. 6 according to some embodiments of the present disclosure. In some embodiments, as shown in FIG. 6, the pixel circuit includes a driving transistor Tm, a gate reset transistor M1, an electrode reset transistor M2, a data writing transistor M3, a threshold voltage compensation transistor M4, a first light-emitting control transistor M5, a second light-emitting control transistor M6, and a storage capacitor Cst. The gate reset transistor M1 includes a first electrode configured to receive a reset signal Ref, a second electrode coupled to a gate of the driving transistor Tm, and a gate configured to receive a first scanning signal S1. The data writing transistor M3 includes a first electrode configured to receive a data signal Vdata, and a second electrode coupled to a first electrode of the driving transistor Tm. The threshold voltage compensation transistor M4 is connected in series between the gate of the driving transistor Tm and a second electrode of the driving transistor Tm. A gate of the data writing transistor M3 and a gate of the threshold voltage compensation transistor M4 are both configured to receive a second scanning signal S2. The driving transistor Tm is connected in series between the first light-emitting control transistor M5 and the second light-emitting control transistor M6. A gate of the first light-emitting control transistor M5 and a gate of the second light-emitting control transistor M6 are both configured to receive a light-emitting control signal E. A first electrode plate of the storage capacitor Cst and a first electrode of the first light-emitting control transistor M5 are both configured to receive a positive power supply signal Pvdd. A second electrode of the second light-emitting control transistor M6 is coupled to the first electrode of the light-emitting element P, and a second electrode of the light-emitting element P is configured to receive a negative power supply signal line Pvee. The electrode reset transistor M2 includes first electrode configured to receive the reset signal Ref, a second electrode coupled to the first electrode of the light-emitting element P, and a gate configured to receive the first scanning signal S1.

As shown in FIG. 7, an operating cycle of the pixel circuit includes a reset phase t1, a data writing phase t2, and a light-emitting phase t3. During the reset phase t1, the gate reset transistor M1 is turned on to reset the gate of the driving transistor Tm, and the electrode reset transistor M2 is turned on to reset the first electrode of the light-emitting element P. During the data writing phase t2, the data writing transistor T3 and the threshold voltage compensation transistor M4 are turned on, the data voltage is written to the gate of the driving transistor Tm, and the threshold voltage of the driving transistor Tm is compensated by the threshold voltage compensation transistor M4. During the light-emitting phase t3, the first light-emitting control transistor M5 and the second light-emitting control transistor M6 are turned on, and the driving current generated by the driving transistor Tm is supplied to the light-emitting element P.

In the pixel circuit shown in FIG. 6, the transistors are p-type transistors. In other embodiments, the transistors in the pixel circuit are n-type transistors, which is not shown in figures.

Figure 8:
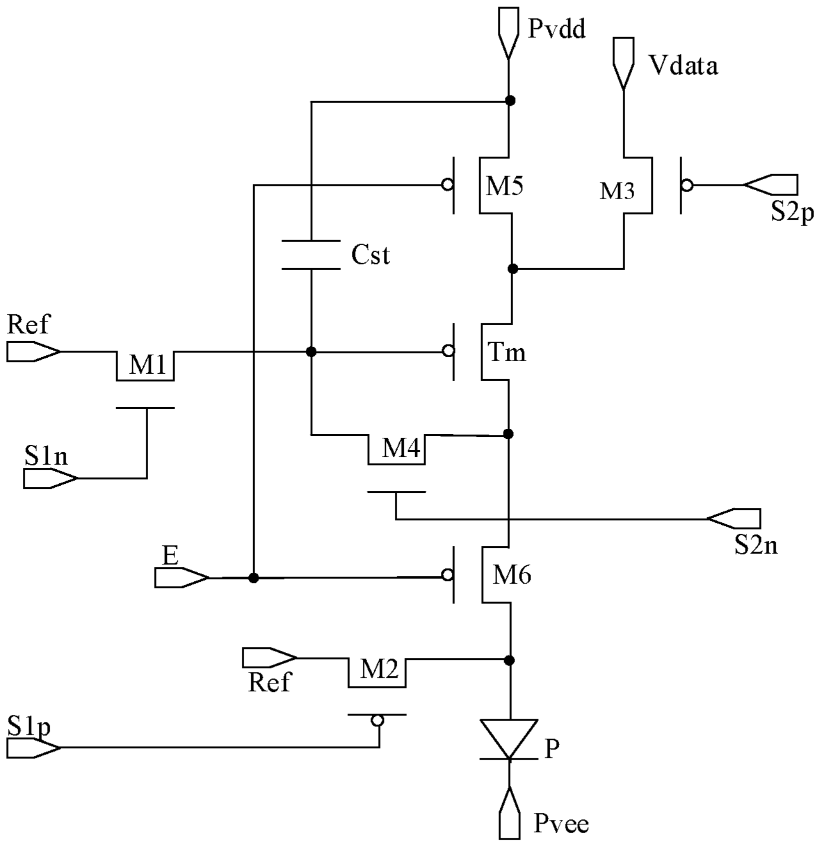
FIG. 8 is another schematic diagram of a pixel circuit in a display panel according to some embodiments of the present disclosure.
Figure 9:
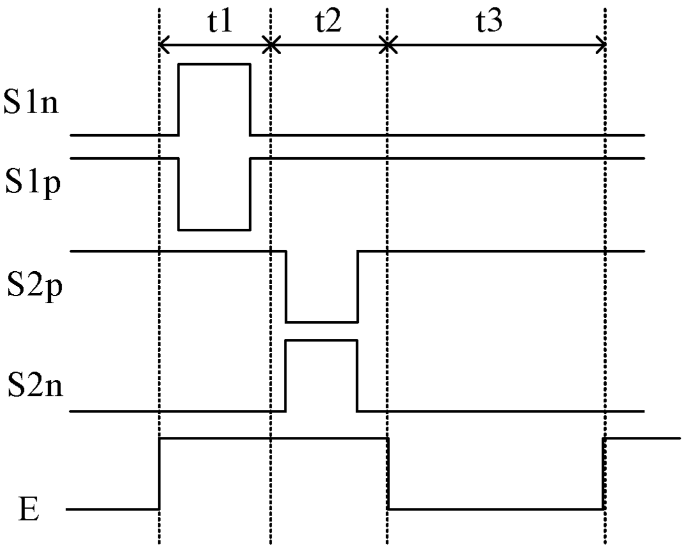
FIG. 9 is a timing sequence of a display panel shown in FIG. 8 according to some embodiments of the present disclosure.

FIG. 8 is another schematic diagram of a pixel circuit in a display panel according to some embodiments of the present disclosure. FIG. 9 is a timing sequence of the display panel shown in FIG. 8 according to some embodiments of the present disclosure. In some embodiments, as shown in FIG. 8, the pixel circuit includes a driving transistor Tm, a gate reset transistor M1, an electrode reset transistor M2, a data writing transistor M3, a threshold voltage compensation transistor M4, a first light-emitting control transistor M5, a second light-emitting control transistor M6, and a storage capacitor Cst. The threshold voltage compensation transistor M4 and the gate reset transistor M1 are n-type transistors, and other transistors of the pixel circuit are p-type transistors. A gate of the gate reset transistor M1 is configured to receive a first-type first scanning signal S1*n*, a gate of the threshold voltage compensation transistor M4 is configured to receive a first-type second scanning signal S2*n*, a gate of the electrode reset transistor M2 is configured to receive a second-type first scanning signal S1*p*, and a gate of the data writing transistor M3 is configured to receive a second-type second scanning signal S2*p*. In some embodiments, the gate reset transistor M1 and the threshold voltage compensation transistor M4 both include metal oxide, and other transistors of the pixel circuit all include silicon. In this way, a leakage current from the gate reset transistor M1 to the gate of the driving transistor Tm and a leakage current from the threshold voltage compensation transistor M4 to the gate of the driving transistor Tm can be reduced, thereby stabilizing the potential of the gate of the driving transistor Tm and improving display flickering.

As shown in the timing sequence of FIG. 9, the operating cycle of the pixel circuit includes a reset phase t1, a data writing phase t2, and a light-emitting phase t3. A high level signal in the first-type scanning signal is an enable signal, and a low level signal in the second-type scanning signals is an enable signal.

In the exemplary embodiments of FIG. 6 and FIG. 8, the gate reset transistor M1 and the electrode reset transistor M2 are configured to receive a same reset signal Ref. In other embodiments, the gate reset transistor M1 is configured to receive a first reset signal, the electrode reset transistor M2 is configured to receive a second reset signal, and the first reset signal and the second reset signal have different voltage amplitudes, which is not illustrated in figures.

In some embodiments, the pixel circuit shown in FIG. 6 and FIG. 8 includes the electrode reset transistor M2. In other embodiments, the pixel circuit cannot include the electrode reset transistor M2. In other embodiments, the pixel circuit cannot include the gate reset transistor M1. In other embodiments, the pixel circuit cannot include the threshold voltage compensation transistor M4.

In other embodiments, one of the gate reset transistor M1 and the threshold voltage compensation transistor M4 is an n-type transistor, and the other one of the gate reset transistor M1 and the threshold voltage compensation transistor M4 is a p-type transistor. In some embodiments, one of the gate reset transistor M1 and the threshold voltage compensation transistor M4 includes metal oxides, and the other one of the gate reset transistor M1 and the threshold voltage compensation transistor M4 includes silicon.

Figure 10:
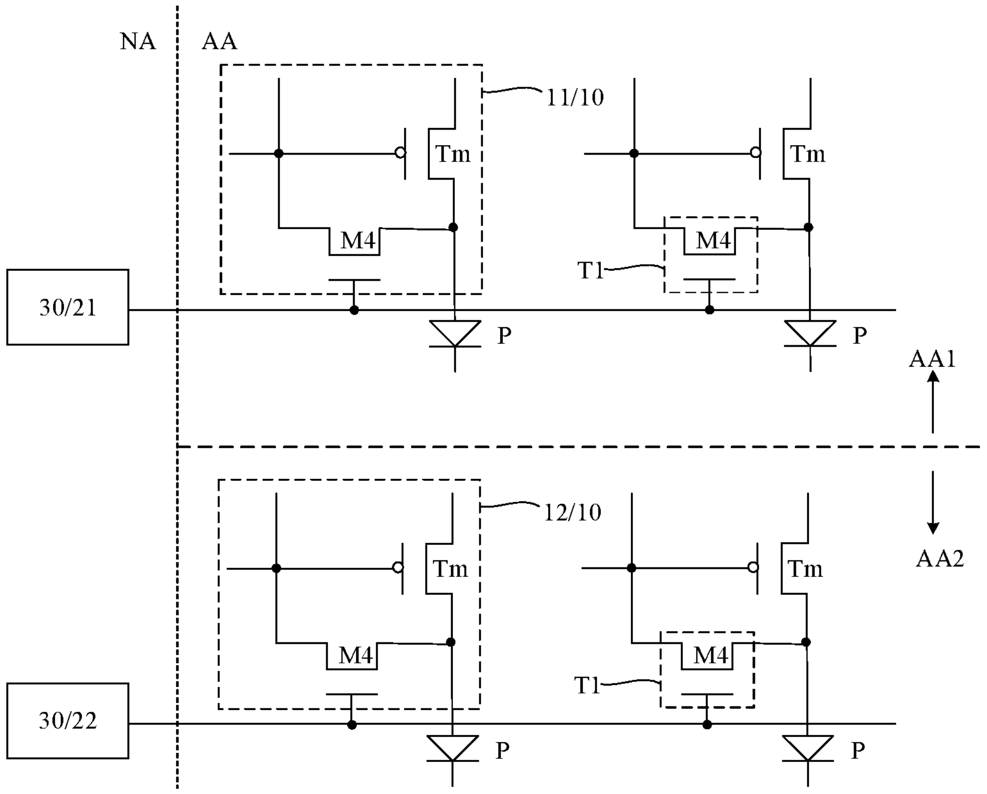
FIG. 10 is another schematic diagram of a local circuit in a display panel according to some embodiments of the present disclosure.

FIG. 10 is another schematic diagram of a local circuit in a display panel according to some embodiments of the present disclosure. The pixel circuit 10 in FIG. 10 is simplified for illustration only. In some embodiments, as shown in FIG. 10, the first transistor T1 includes the threshold voltage compensation transistor M4, and the driving circuits in the non-display area include a first driving circuit 21 and a second driving circuit 22. Each of the first driving circuit 21 and the second driving circuit 22 includes cascaded shift registers 30. A gate of the threshold voltage compensation transistor M4 in the first pixel circuit 11 is coupled to the first driving circuit 21, and the gate of the threshold voltage compensation transistor M4 in the second pixel circuit 12 is coupled to the second driving circuit 22. In some embodiments, as shown in FIG. 10, the driving transistor Tm is a p-type transistor, and the threshold voltage compensation transistor M4 is an n-type transistor. Combined with the pixel circuit shown in FIG. 8, the threshold voltage compensation transistor M4 and the data writing transistor M3 are both turned on during the data writing phase, such that the data voltage provided by the data writing transistor M3 is written to the gate of the driving transistor Tm. The threshold voltage compensation transistor M4 in the first pixel circuit 11 and the threshold voltage compensation transistor M4 in the second pixel circuit 12 are independently controlled by two driving circuits, such that the data writing process of the first pixel circuit 11 and the data writing process of the second pixel circuit 12 can be independently controlled. The threshold voltage compensation transistors M4 in the first pixel circuit 11 and the second pixel circuit 12 are controlled to have different turning-on frequencies, such that the data writing frequency of the first pixel circuit 11 is different from the data writing frequency of the second pixel circuit 12, so that the image refresh frequency of the first display area AA1 is different from the image refresh frequency of the second display area AA2, and different areas of the display panel display images at different frequencies, thereby reducing the power consumption.

Figure 11:
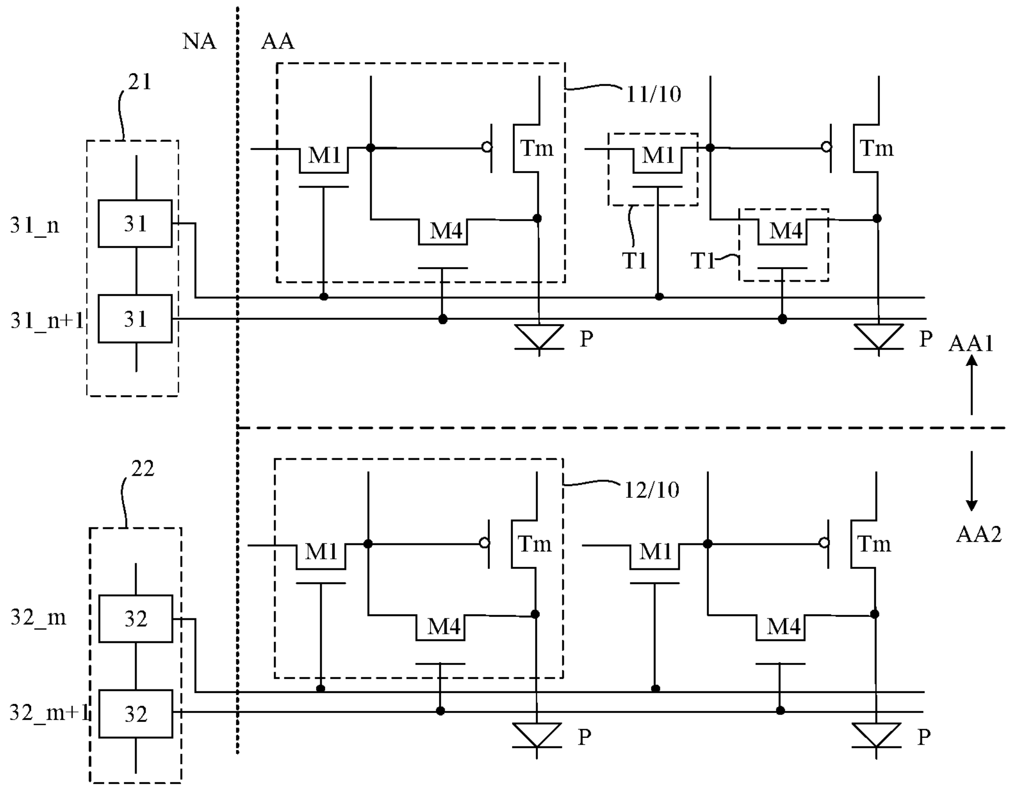
FIG. 11 is another schematic diagram of a local circuit in a display panel according to some embodiments of the present disclosure.

FIG. 11 is another schematic diagram of a local circuit in a display panel according to some embodiments of the present disclosure. In some embodiments, as shown in FIG. 11, the first transistors T1 include a threshold voltage compensation transistor M4 and a gate reset transistor M1. A gate of the gate reset transistor M1 and a gate of the threshold voltage compensation transistor M4 in the first pixel circuit 11 are both coupled to the first driving circuit 21, and a gate of the gate reset transistor M1 and a gate of the threshold voltage compensation transistor M4 in the second pixel circuit 12 are both coupled to the second driving circuit 22. In some embodiments, the threshold voltage compensation transistor M4 and the gate reset transistor M1 are transistors of a same type. In the exemplary embodiments shown in FIG. 11, the threshold voltage compensation transistor M4 and the gate reset transistor M1 are both n-type transistors. In the pixel circuit, the gate reset transistor M1 is configured to reset the gate of the driving transistor Tm, and the threshold voltage compensation transistor M4 is configured to cooperate with the data writing transistor so as to write the data voltage to the gate of the driving transistor Tm and to compensate the threshold voltage of the driving transistor Tm. In some embodiments shown in FIG. 11, the first pixel circuit 11 and the second pixel circuit 12 are respectively controlled by the first driving circuit 21 and the second driving circuit 22. As a result, in the operating process of the first pixel circuit 11, the frequency at which the data voltage is written to the gate of the driving transistor Tm is equal to the frequency at which the gate of the driving transistor Tm is reset; and in the operating process of the second pixel circuit 12, the frequency at which the data voltage is written to the gate of the driving transistor Tm is equal to the frequency at which the gate of the driving transistor Tm is reset. The frequency at which the data voltage is written to the gate of the driving transistor Tm in the operating process of the first pixel circuit 11 can be different from the frequency at which the data voltage is written to the gate of the driving transistor Tm in the operating process of the second pixel circuit 12. In this way, it can be achieved that the image refresh frequency of the first display area AA1 is different from the image refresh frequency of the second display area AA2, so that different areas of the display panel display images at different frequencies, thereby reducing the power consumption.

As shown in FIG. 11, the first driving circuit 21 includes cascaded shift registers 31, and the second driving circuit 22 includes cascaded shift registers 32. In the first pixel circuit 11, the gate of the gate reset transistor M1 is coupled to an n-th stage first shift register 31_*n*, and the gate of the threshold voltage compensation transistor M4 is coupled to an (n+1)-th stage first shift register 31_*n*+1, where n is a positive integer. In the second pixel circuit 12, the gate of the gate reset transistor M1 is coupled to an m-th stage second shift register 32_*m*, and the gate of the threshold voltage compensation transistor M4 is coupled to an (m+1)-th stage second shift register 32_*m*+1, where m is a positive integer. That is, the gate reset transistor M1 and the threshold voltage compensation transistor M4 in the first pixel circuit 11 are connected to two adjacent stages of first shift registers 31, respectively, and the gate reset transistor M1 and the threshold voltage compensation transistor M4 in the second pixel circuit 12 are connected to two adjacent stages of second shift registers 32, respectively.

Figure 12:
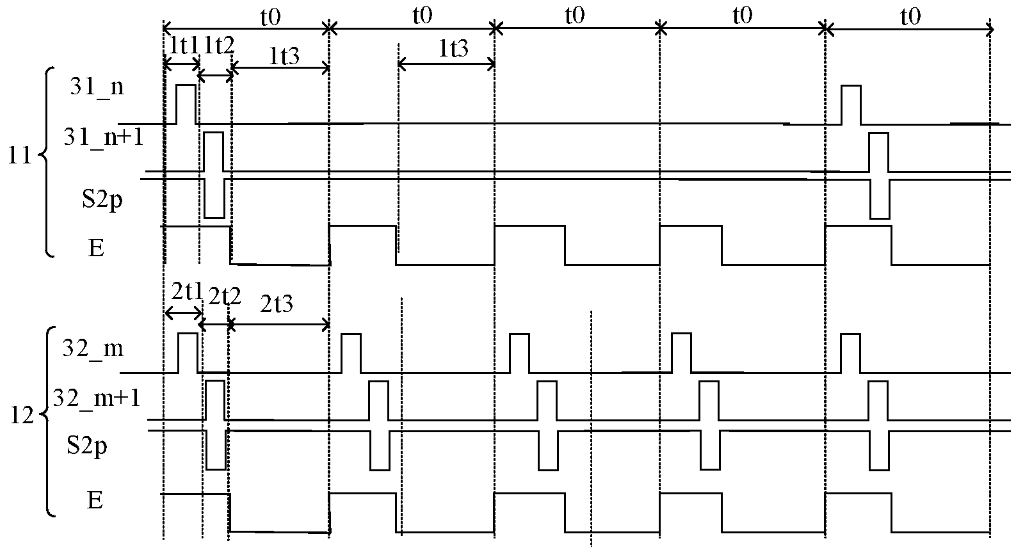
FIG. 12 is a timing sequence of a display panel shown in FIG. 11 according to some embodiments of the present disclosure.

FIG. 12 is a timing sequence of the display panel shown in FIG. 11 according to some embodiments of the present disclosure. The pixel circuit 10 in FIG. 11 can be referred to the pixel circuit 10 provided in the embodiments of FIG. 8. As shown in FIG. 12, an operating process of the first pixel circuit 11 includes a gate reset phase 1*t*1, a data writing phase 1*t*2, and a light-emitting phase 1*t*3; and an operating process of the second pixel circuit 12 includes a gate reset phase 2*t*1, a data writing phase 2*t*2, and a light-emitting phase 2*t*3. The t0 is a cycle for the second shift register 32 in the second driving circuit 22 to provide the enable signal, a cycle for the first shift register 31 to provide the enable signal is 4*t0. Here, t0 represents a duration rather than an operating moment of the display panel. When understanding the timing sequence of FIG. 12, corresponding timing sequences of the first pixel circuit 11 and the second pixel circuit 12 can be understood separately. The timing sequence of FIG. 12 can clearly illustrate that the frequency at which the enabling signal provided by the first shift register 31 is different from the frequency at which the enabling signal provided by the second shift register 32, and does not represent the operating timing sequence of the first pixel circuit 11 and the operating timing sequence of the second pixel circuit 12 in the same period. Taking a period where the n-th stage first shift register 31_*n* provides the enable signal and a period where the m-th stage second shift register 32_*m* provides the enable signal in a first duration t0 as an example, FIG. 12 does not limit that the n-th stage first shift register 31_*n* and the m-th stage second shift register 32_*m* provide the enable signals at a same moment. It should be noted that if the first pixel circuit 11 and the second pixel circuit 12 are located in a same pixel circuit row, during the first duration t0 of the operating process of the display panel, a period in which the n-th stage first shift register 31_*n* provides the enable signal and a period in which the m-th stage second shift register 32_*m* provides the enable signal are a same moment. If the first pixel circuit 11 and the second pixel circuit 12 are located in different pixel circuit rows, during the first duration t0 of the operating process of the display panel, the period in which the n-th stage first shift register 31_*n* provides the enable signal and the period in which the m-th stage second shift register 32_*m* provides the enable signal are different periods. When understanding the timing sequences in the following embodiments of the present disclosure, reference can be made to the above description. In the timing sequences in the following embodiments, it is not limited to that the operating timing sequence of the first pixel circuit 11 and the operating timing sequence of the second pixel circuit 12 are arranged in a same period.

FIG. 12 illustrates five periods t0. In a first period t0 and a fifth period t0, the first shift register 31 provides the enable signal. The first period t0 and the fifth period t0 can be regarded as writing frames within the operating process of the first pixel circuit 11. A second period t0, a third period t0, and a fourth period t0 can be regarded as holding frames within the operating process of the first pixel circuit 11.

During the first period t0, the operating process of the first pixel circuit 11 includes a gate reset phase 1*t*1, a data writing phase 1*t*2, and a light-emitting phase 1*t*3, and the first pixel circuit 111 provides the driving current to the light-emitting element P under the control of the data voltage so as to control the light-emitting element P to emit light.

During the second period t0, the operating process of the first pixel circuit 11 incudes only a light-emitting phase 1*t*3 and does not include a gate reset phase 1*t*1 and a data writing phase 1*t*2, and during the light-emitting phase 1*t*3 of the second cycle t0, the potential of the gate of the driving transistor Tm in the first pixel circuit 11 maintains the potential of the data voltage that is written to the gate of the driving transistor Tm in the previous period. During the light-emitting phase 1*t*3 of the second period t0, the driving transistor Tm generates the driving current and provides the driving current to the light-emitting element P, and the light-emitting element P emits light. That is, the brightness of the light-emitting element P during the second period t0 maintains the brightness of the light-emitting element P during the first period t0.

Similarly, the brightness of the light-emitting element P during the third period t0 and the brightness of the light-emitting element P during the fourth period t0 maintains the brightness of the light-emitting element P during the first period t0. Therefore, the first period t0 is the writing frame of the operating process of the first pixel circuit 11, and the second cycle t0, the third period t0, and the fourth period t0 are the holding frames of the first pixel circuit 11. In other words, during the first to fourth periods t0, the first pixel circuit 11 has only one data writing phase 1*t*2, and it can be regarded that the image displayed in the first display area AA1 driven by the first pixel circuits 11 is refreshed only once.

For the second pixel circuit 12, each period t0 includes one data writing phase 2*t*2, so the image displayed by the second display area AA2 driven by the second pixel circuits 12 can be refreshed for four times. As a result, the first display area AA1 and the second display area AA2 have different image refresh frequencies. The first display area AA1 is refreshed at a low frequency, and the second display area AA2 is refreshed at a high frequency, so that different areas of the display panel display images at different frequencies, thereby reducing the power consumption.

Figure 13:
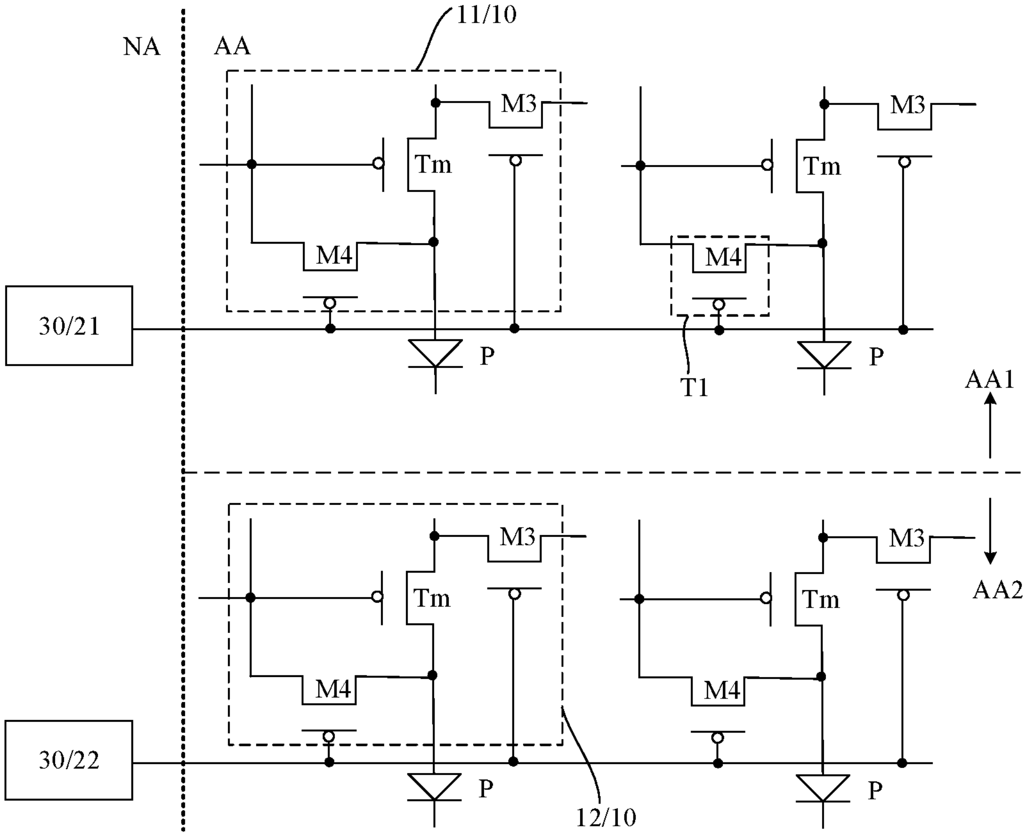
FIG. 13 is another schematic diagram of a local circuit in a display panel according to some embodiments of the present disclosure.
Figure 14:
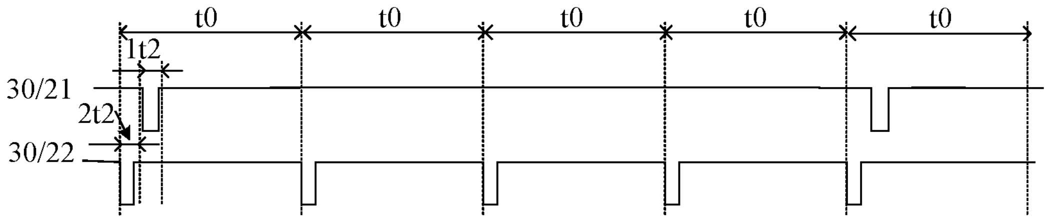
FIG. 14 is a timing sequence of a display panel shown in FIG. 13 according to some embodiments of the present disclosure.

In other embodiments, the threshold voltage compensation transistor M4 and the data writing transistor M3 are transistors of a same type. FIG. 13 is another schematic diagram of a local circuit in a display panel according to some embodiments of the present disclosure. FIG. 14 is a timing sequence of the display panel shown in FIG. 13 according to some embodiments of the present disclosure. As shown in FIG. 13, the first transistor T1 includes a threshold voltage compensation transistor M4. In the first pixel circuit 11, the gate of the data writing transistor M3 and the gate of the threshold voltage compensation transistor M4 are both coupled to the first driving circuit 21. In the second pixel circuit 12, the gate of the data writing transistor M3 and the gate of the threshold voltage compensation transistor M4 are both coupled to the second driving circuit 22. In some embodiments, both the data writing transistor M3 and the threshold voltage compensation transistor M4 are p-type transistors. The data writing transistor M3 and the threshold voltage compensation transistor M4 in the pixel circuit 10 are coupled to a same driving circuit 20.

The operating principle of the pixel circuit 10 in FIG. 13 can be referred to the description of the embodiments of FIG. 6.

As shown in FIG. 14, t0 is a cycle during which the shift register 30 in the second driving circuit 22 provides the enable signal. A cycle during which the shift register 30 in the first driving circuit 21 provides the enable signal is 4*t0. The frequency at which the enable signal is provided by the shift register 30 in the first driving circuit 21 is smaller than the frequency at which the enable signal is provided by the shift register 30 in the second driving circuit 22. The period 1*t*2 is the data writing phase of the operating process of the first pixel circuit 11, and the period 2*t*2 is the data writing phase of the operating process of the second pixel circuit 12. The data writing frequency of the first pixel circuit 11 is smaller than the data writing frequency of the second pixel circuit 12, so the image refresh frequency of the first display area AA1 is smaller than the image refresh frequency of the second display area AA2. The first display area AA1 is refreshed with a low frequency, and the second display area AA2 is refreshed with a high frequency, so that different areas of the display panel display images at different frequencies, thereby reducing the power consumption.

Figure 15:
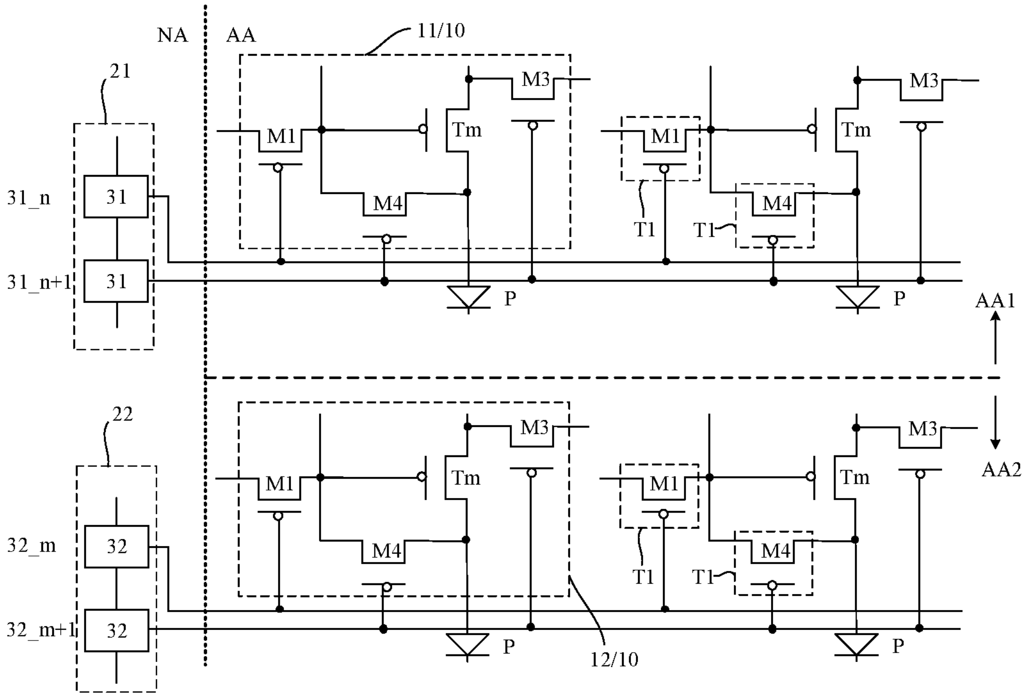
FIG. 15 is another schematic diagram of a local circuit in a display panel according to some embodiments of the present disclosure.

FIG. 15 is another schematic diagram of a local circuit in a display panel according to some embodiments of the present disclosure. In some embodiments, as shown in FIG. 15, the first transistors T1 includes a gate reset transistor M1 and a threshold voltage compensation transistor M4. In the first pixel circuit 11, the gate reset transistor M1, the threshold voltage compensation transistor M4, and the data writing transistor M3 are all coupled to the first driving circuit 21. In the second pixel circuit 12, the gate reset transistor M1, the threshold voltage compensation transistor M4, and the data writing transistor M3 are all coupled to the second driving circuit 22. The first driving circuit 21 includes cascaded first shift registers 31, and the second driving circuit 22 includes cascaded second shift registers 32. In the first pixel circuit 11, a gate of the gate reset transistor M1 is coupled to an n-th stage first shift register 31_*n*, and a gate of the threshold voltage compensation transistor M4 is coupled to an (n+1)-th stage first shift register 31_*n*+1, where n is a positive integer. In the second pixel circuit 12, a gate of the gate reset transistor M1 is coupled to an m-th stage second shift register 32_*m*, and a gate of the threshold voltage compensation transistor M4 is coupled to an (m+1)-th stage second shift register 32_*m*+1, where m is a positive integer. The gate reset transistor M1 and the threshold voltage compensation transistor M4 in the first pixel circuit 11 are coupled to two adjacent stages of first shift registers 31, respectively. The gate reset transistor M1 and the threshold voltage compensation transistor M4 in the second pixel circuit 12 are coupled to two adjacent stages of second shift registers 32, respectively.

As shown in FIG. 15, the data writing transistor M3 in the first pixel circuit 11 is coupled to the first driving circuit 21, and the data writing transistor M3 in the second pixel circuit 12 is coupled to the second driving circuit 22. That is, in the pixel circuit 10, the data writing transistor M3 and the threshold voltage compensation transistor M4 are coupled to a same driving circuit. In the embodiments of FIG. 15, the gate reset transistor M1, the threshold voltage compensation transistor M4, and the data writing transistor M3 are all p-type transistors. The complete structure of the pixel circuit in the embodiment of FIG. 15 can be referred to the structure of the pixel circuit in the embodiments of FIG. 6.

Figure 16:
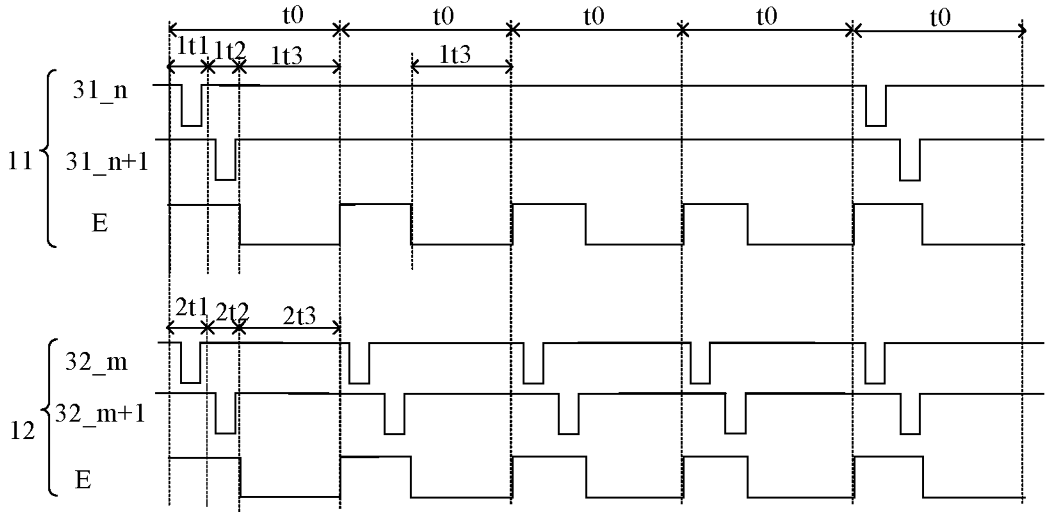
FIG. 16 is a timing sequence of a display panel shown in FIG. 15 according to some embodiments of the present disclosure.

FIG. 16 is a timing sequence of the display panel shown in FIG. 15 according to some embodiments of the present disclosure. The period t0 in the timing sequence shown in FIG. 16 can be referred to the description of the embodiments of FIG. 12. t0 is a cycle during which the second shift register 32 in the second driving circuit 22 provides the enable signal, and a cycle during which the first shift register 21 in the first driving circuit 21 provides the enable signal is 4*t0. As shown in FIG. 16, during a first period t0, the operating phases of the first pixel circuit 11 include a gate reset phase 1*t*1, a data writing phase 1*t*2, and a light-emitting phase 1*t*3. The first pixel circuit 11 supplies a driving current to the light-emitting element P under control of the written data voltage to control the light-emitting element P to emit light. During a second period t0, the operating phase of the first pixel circuit 11 includes only a light-emitting phase 1*t*3 during which the first pixel circuit 11 controls the brightness of the light-emitting element P to maintain the brightness of the light-emitting element P during the first period t0. Similarly, during a third period t0 and a fourth period t0, the light-emitting element P maintains the brightness during the first period t0. The first period t0 is a writing frame in the operating process of the first pixel circuit 11. The second period t0, the third period t0, and the fourth period t0 are holding frames in the operating process of the first pixel circuit 11. During the first to fourth periods t0, the first pixel circuit 11 has only one data writing phase 1*t*2, and thus it can be regarded that the image displayed in the first display area AA1 that is driven by the first pixel circuit 11 is refreshed only once.

The operating phases of the second pixel circuit 12 include a gate reset phase 2*t*1, a data writing phase 2*t*2, and a light-emitting phase 2*t*3. Each period t0 of the second pixel circuit 12 includes one data writing phase 2*t*2. As a result, the image displayed in the second display area AA2 that is driven by the second pixel circuit 12 can be refreshed four times. As a result, the first display area AA1 and the second display area AA2 have different image refresh frequencies, the first display area AA1 is refreshed with a low frequency, and the second display area AA2 is refreshed with a high frequency, so that different areas of the display panel display images at different frequencies, thereby reducing the power consumption.

Figure 17:
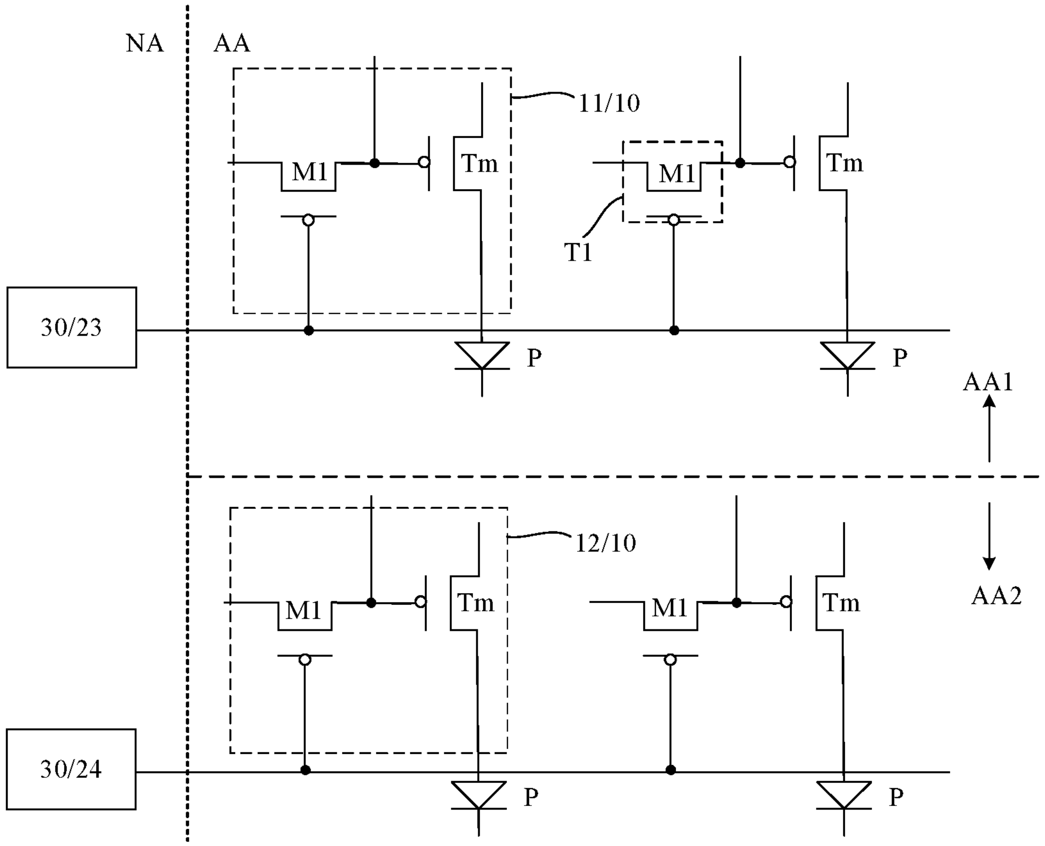
FIG. 17 is another schematic diagram of a local circuit in a display panel according to some embodiments of the present disclosure.

FIG. 17 is another schematic diagram of a local circuit in a display panel according to some embodiments of the present disclosure. In some embodiments, as shown in FIG. 17, the first transistor T1 includes a gate reset transistor M1, and the driving circuits 20 include a third driving circuit 23 and a fourth driving circuit 24. A gate of the gate reset transistor M1 in the first pixel circuit 11 is coupled to the third driving circuit 23, and a gate of the gate reset transistor M1 in the second pixel circuit 12 is coupled to the fourth driving circuit 24. In the embodiments, the gate reset transistor M1 in the first pixel circuit 11 and the gate reset transistor M1 in the second pixel circuit 12 are driven by different driving circuits 20, respectively, such that the potential of the gate of the driving transistor Tm in the first pixel circuit 11 and the potential of the gate of the driving transistor Tm in the second pixel circuit 12 can be controlled independently, and then the first display area AA1 and the second display area AA2 have different image refresh frequencies.

Figure 18:
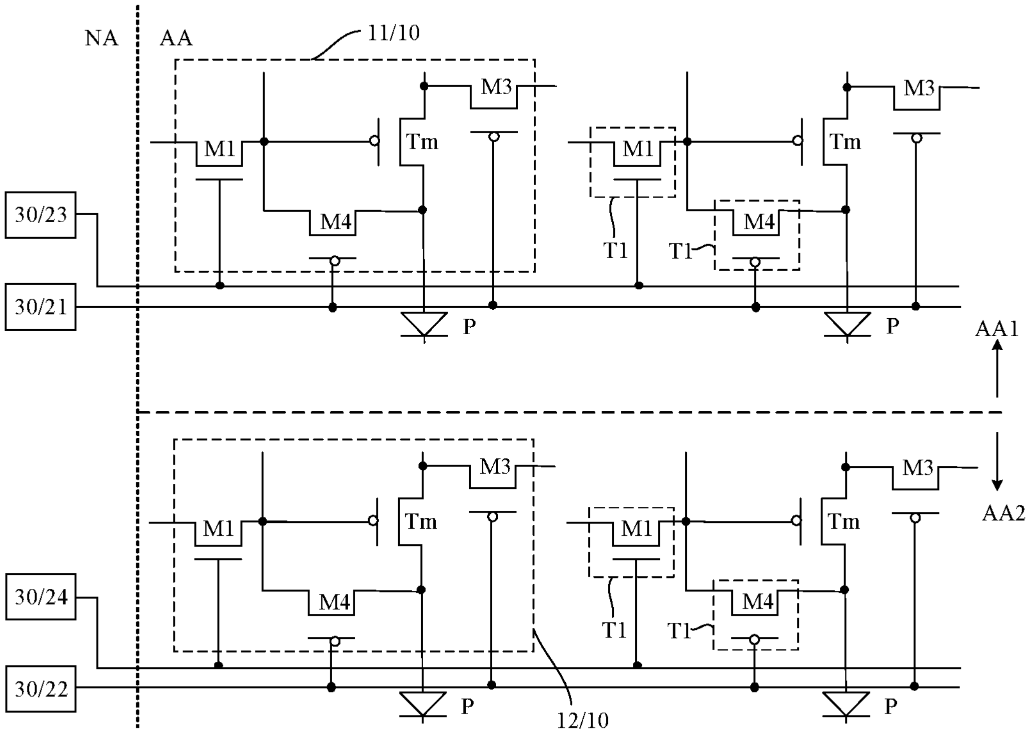
FIG. 18 is another schematic diagram of a local circuit in a display panel according to some embodiments of the present disclosure.

FIG. 18 is another schematic diagram of a local circuit in a display panel according to some embodiments of the present disclosure. In some embodiments, as shown in FIG. 18, the first transistors T1 include a gate reset transistor M1 and a threshold voltage compensation transistor M4 that are transistors of different types. One of the gate reset transistor M1 and the threshold voltage compensation transistor M4 includes metal oxide, and the other one of the gate reset transistor M1 and the threshold voltage compensation transistor M4 includes silicon. In the embodiments shown in FIG. 18, the gate reset transistor M1 is an n-type transistor, and the threshold voltage compensation transistor M4 is a p-type transistor. The gate of the gate reset transistor M1 in the first pixel circuit 11 is coupled to the third driving circuit 23, and the gate of the gate reset transistor M1 in the second pixel circuit 12 is coupled to the fourth driving circuit 24. The threshold voltage compensation transistor M4 and the data writing transistor M3 in the first pixel circuit 11 are both coupled to the first driving circuit 21, and the threshold voltage compensation transistor M4 and the data writing transistor M3 in the second pixel circuit 12 are both coupled to the second driving circuit 22.

Figure 19:
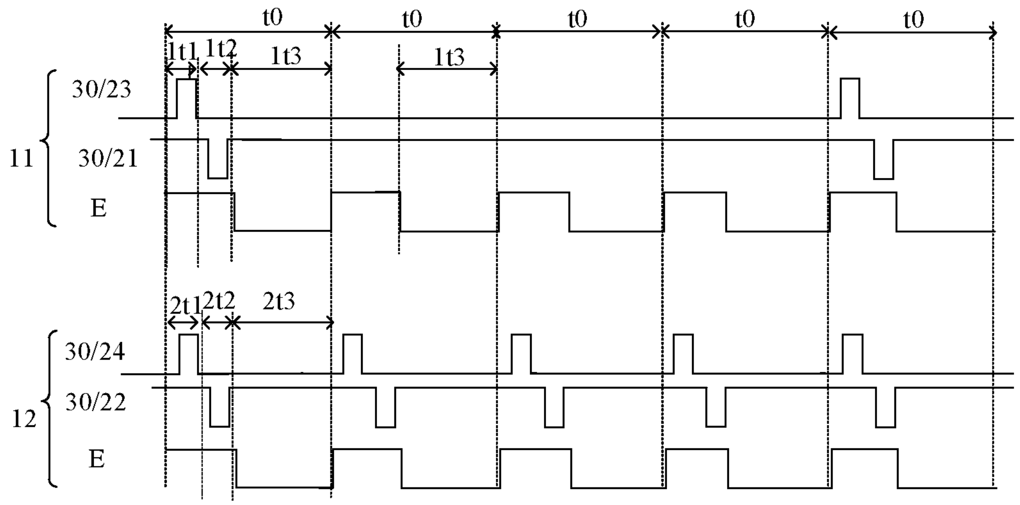
FIG. 19 is a timing sequence of a display panel shown in FIG. 18 according to some embodiments of the present disclosure.

FIG. 19 is a timing sequence of the display panel shown in FIG. 18 according to some embodiments of the present disclosure. As shown in FIG. 19, t0 is a cycle during which the shift register 30 in the second driving circuit 22 provides the enable signal. In order to cooperate with the operating of the second pixel circuit 12, a cycle during which the shift register 30 in the fourth driving circuit 24 is equal to a cycle during which the shift register 30 in the second driving circuit 22 provides the enable signal. The cycle during which the shift register 30 in the first driving circuit 21 provides the enable signal is 4*t0, and the cycle during which the shift register 30 in the third driving circuit 23 provides the enable signal is equal to the cycle in which the shift register 30 in the first driving circuit 21 provides the enable signal. The frequency at which the enable signal is provided by the shift register 30 of the first driving circuit 21 is smaller than a frequency at which the enable signal is provided by the shift register 30 of the second driving circuit 22.

As shown in FIG. 19, during a first period t0, the operating phases of the first pixel circuit 11 include a gate reset phase 1*t*1, a data writing phase 1*t*2, and a light-emitting phase 1*t*3. The first pixel circuit 11 is configured to supply the driving current to the light-emitting element P under the control of the written data voltage, and the driving current can control the light-emitting element P to emit light. During a second period t0, the work phase of the first pixel circuit 11 includes only a light-emitting phase 1*t*3 during which the first pixel circuit 11 controls the brightness of the light-emitting element P to maintain the brightness during the first period t0. Similarly, in a third period t0 and a fourth period t0, the light-emitting element P maintains the brightness of the light-emitting element P during the first period t0. The first period t0 is a writing frame of the operating process of the first pixel circuit 11. The second period t0, the third period t0, and the fourth period t0 are holding frames of the operating process of the first pixel circuit 11. During the first to fourth periods t0, the first pixel circuit 11 has only one data writing phase 1*t*2, and the image displayed in the first display area AA1 that is driven by the first pixel circuit 11 is refreshed only once.

As shown in FIG. 19, the operating phases of the second pixel circuit 12 include a gate reset phase 2*t*1, a data writing phase 2*t*2, and a light-emitting phase 2*t*3. During each period to, the second pixel circuit 12 has one data writing phase 2*t*2. As a result, the image displayed in the second display area AA2 that is driven by the second pixel circuit 12 can be refreshed four times, such that the first display area AA1 and the second display area AA2 have different image refresh frequencies, the first display area AA1 is refreshed at a low frequency, and the second display area AA2 is refreshed with a high frequency, so that different areas of the display panel display images at different frequencies, thereby reducing the power consumption.

In some embodiments shown in FIG. 18, the gate reset transistor M1 is an n-type transistor, and the threshold voltage compensation transistor M4 is a p-type transistor. In the pixel circuit, if the data writing transistor M3 is a p-type transistor, the data writing transistor M3 and the threshold voltage compensation transistor M4 are transistors of a same type. The data writing transistor M3 and the threshold voltage compensation transistor M4 in the first driving circuit 11 are coupled to a same driving circuit 20, and the data writing transistor M3 and the threshold voltage compensation transistor M4 in the second pixel circuit 12 are coupled to another same driving circuit 20.

In some embodiments, the gate reset transistor M1 is a p-type transistor, and the threshold voltage compensation transistor M4 is an n-type transistor. That is, the data writing transistor M3 and the threshold voltage compensation transistor M4 are transistors of different types. The first transistors T1 include the gate reset transistor M1 and the threshold voltage compensation transistor M4. The threshold voltage compensation transistor M4 in the first pixel circuit 11 is coupled to the first driving circuit 21, and the threshold voltage compensation transistor M4 in the second pixel circuit 12 is coupled to the second driving circuit 22. The gate reset transistor M1 in the first pixel circuit 11 is coupled to the third driving circuit 23, and the gate reset transistor M1 in the second pixel circuit 12 is coupled to the fourth driving circuit 24. The data writing transistor M3 and the threshold voltage compensation transistor M4 in the first pixel circuit 11 are coupled to different driving circuits, and the data writing transistor M3 and the threshold voltage compensation transistor M4 in the second pixel circuit 12 are coupled to different driving circuits, which is not illustrated in figures.

Figure 20:
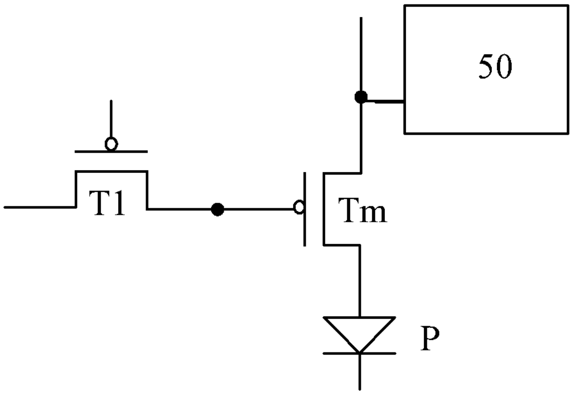
FIG. 20 is another schematic diagram of a pixel circuit in a display panel according to some embodiments of the present disclosure.

FIG. 20 is another schematic diagram of a pixel circuit in a display panel according to some embodiments of the present disclosure. In some embodiments, as shown in FIG. 20, the pixel circuit includes a bias adjusting module 50. The bias adjusting module 50 is coupled to one of a first electrode of the driving transistor Tm and a second electrode of the driving transistor Tm. FIG. 20 illustrates that the bias adjusting module 50 is coupled to the first electrode of the driving transistor Tm. The bias adjusting module 50 is configured to adjust a bias state of the driving transistor Tm, so that the driving transistor Tm can be in a positive biased state under a fixed voltage for a long time, which will cause a hysteresis effect causing a threshold voltage shift. In this way, in applications, the effect of the hysteresis effect of the driving transistor Tm on the driving transistor Tm can be improved.

Figure 21:
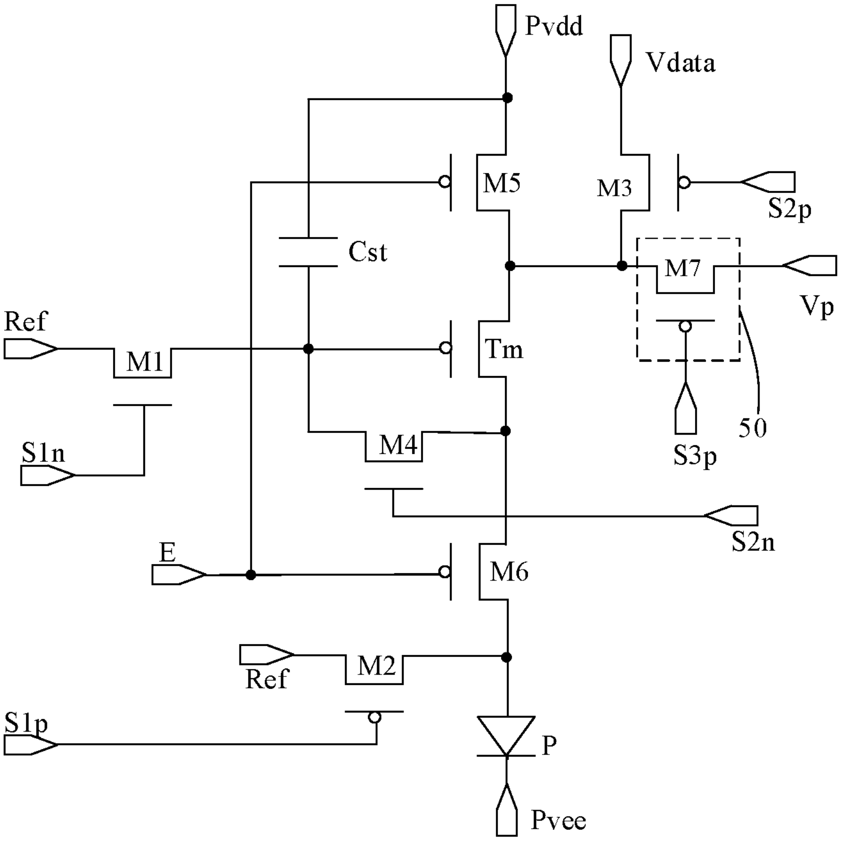
FIG. 21 is another schematic diagram of a pixel circuit in a display panel according to some embodiments of the present disclosure.

FIG. 21 is another schematic diagram of a pixel circuit in a display panel according to some embodiments of the present disclosure. In some embodiments, with reference to FIG. 8 and FIG. 21, the bias adjusting module 50 includes a bias adjusting transistor M7. The bias adjusting transistor M7 is coupled to the first electrode of the driving transistor Tm. A gate of the bias adjusting transistor M7 is configured to receive a second-type third scanning signal S3*p*. A first electrode of the bias adjusting transistor M7 is configured to receive a bias signal Vp. In some embodiments, the bias signal Vp is a data voltage signal corresponding to a low gray scale. In some embodiments, the bias signal Vp is a data voltage signal corresponding to gray scale 8 or gray scale 10.

Figure 22:
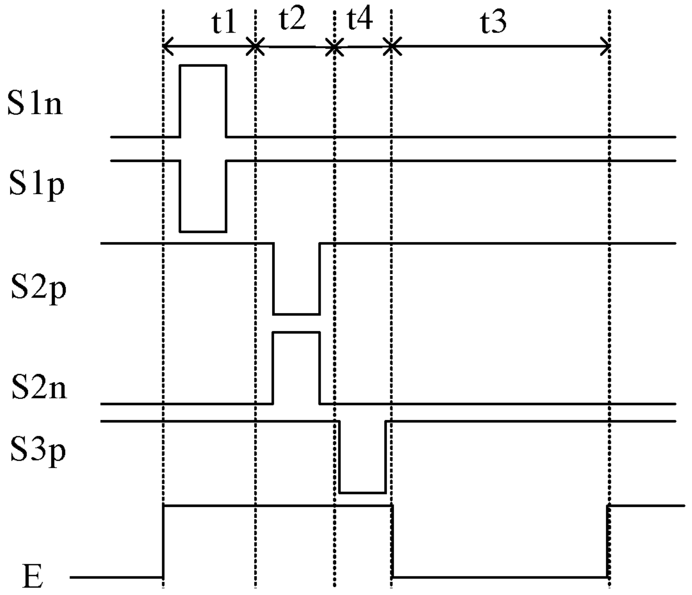
FIG. 22 is a timing sequence of a pixel circuit shown in FIG. 21 according to some embodiments of the present disclosure.

FIG. 22 is a timing sequence of the pixel circuit shown in FIG. 21 according to some embodiments. In some embodiments, as shown in FIG. 22, the operating phases of the pixel circuit also includes a bias adjusting phase t4. During the bias adjusting phase t4, the bias adjusting transistor M7 is turned on to write the bias signal Vp to the first electrode of the driving transistor Tm so as to adjust the bias state of the driving transistor Tm. In the operating cycle of the pixel circuit, the bias adjusting phase t4 is prior to the light-emitting phase t3.

In some embodiments shown in FIG. 21, the bias adjusting module 50 is coupled to the first electrode of the driving transistor Tm. That is, both the bias adjusting module 50 and the data writing transistor M3 are coupled to the first electrode of the driving transistor Tm. In other embodiments, the bias adjusting module 50 is coupled to the second electrode of the driving transistor Tm. That is, the bias adjusting module 50 and the first electrode of the threshold voltage compensation transistor M4 are both coupled to the second electrode of the driving transistor Tm, which is not illustrated in figures.

Figure 23:
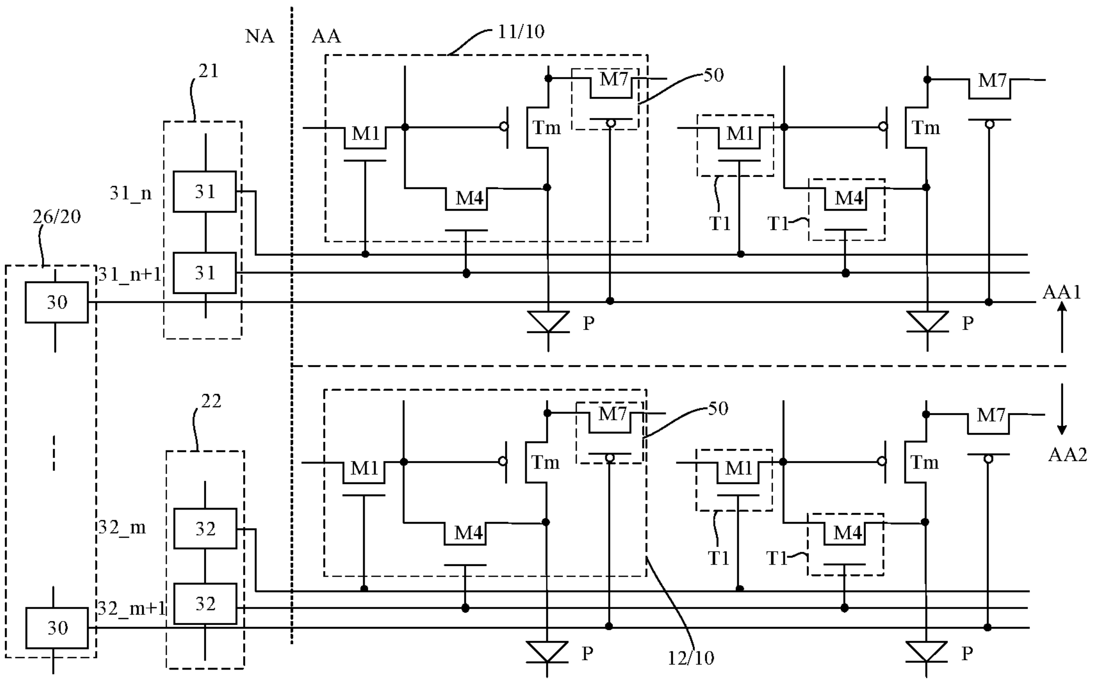
FIG. 23 is another schematic diagram of a local circuit in a display panel according to some embodiments of the present disclosure.
Figure 24:
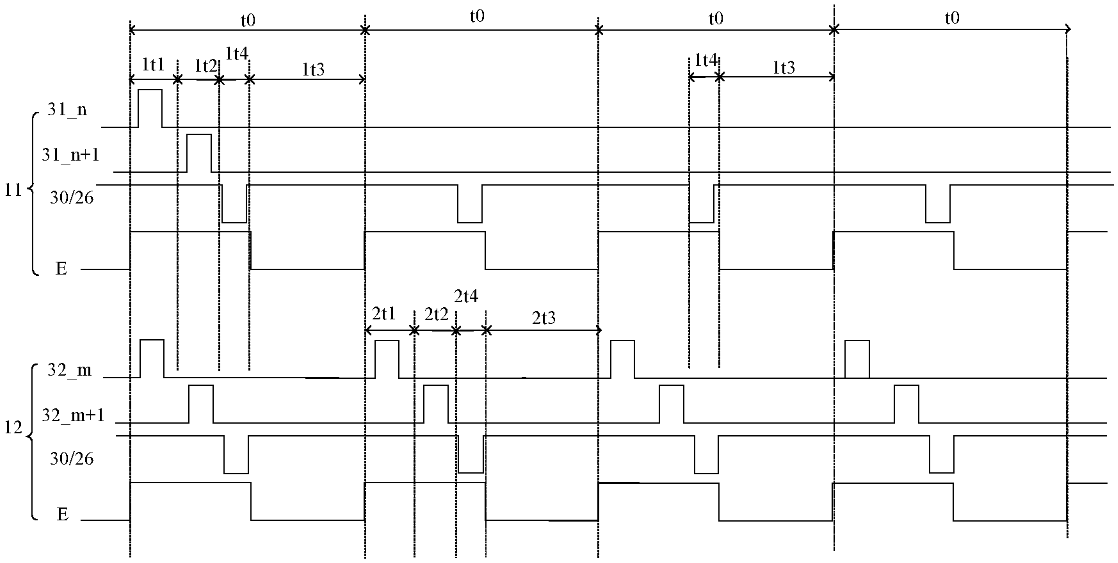
FIG. 24 is a timing sequence of a display panel shown in FIG. 23 according to some embodiments of the present disclosure.

FIG. 23 is another schematic diagram of a local circuit in a display panel according to some embodiments of the present disclosure. FIG. 24 is a timing sequence of the display panel shown in FIG. 23 according to some embodiments of the present disclosure. In one embodiment, as shown in FIG. 23, each of the first pixel circuit 11 and the second pixel circuit 12 includes a bias adjusting module 50. The driving circuits 20 include a sixth driving circuit 26. The bias adjusting module 50 in the first pixel circuit 11 and the bias adjusting module 50 in the second pixel circuit 12 are both coupled to the sixth driving circuit 26.

As shown in FIG. 24, t0 is a length of a cycle during which the second shift register 32 in the second driving circuit 22 provides the enable signal, and a cycle during which the first shift register 31 in the first driving circuit 21 provides the enable signal is longer than t0. Accordingly, the frequency at which the first shift register 31 provides the enable signal is smaller than the frequency at which the second shift register 32 provides the enable signal. As shown in the timing sequence of FIG. 24, the operating phases of the first pixel circuit 11 include a gate reset phase lit, a data writing phase 1*t*2, an light-emitting phase 1*t*3, and a bias adjusting phase 1*t*4; and the operating phases of the second pixel circuit 12 include a gate reset phase 2*t*1, a data writing phase 2*t*2, an light-emitting phase 2*t*3, and a bias adjusting phase 2*t*4. In a second period t0, the first pixel circuit 11 does not include the data writing phase 1*t*2. The frequency at which the data voltage is written to the gate of the driving transistor Tm when the first pixel circuit 11 is operating is smaller than the frequency at which the data voltage is written to the gate of the driving transistor Tm when the second pixel circuit 12 is operating, such that the first display area AA1 and the second display area AA2 have different image refresh frequencies.

In some embodiments, the sixth driving circuit 26 is configured to control both the bias adjusting module 50 in the first pixel circuit 11 and the bias adjusting module 50 in the second pixel circuit 12. The sixth driving circuit 26 is shared by the first pixel circuit 11 and the second pixel circuit 12. The sixth driving circuit 26 is a common driving circuit. During each period t0, the bias adjusting module 50 in the first pixel circuit 11 and the bias adjusting module 50 in the second pixel circuit 12 each are turned on once. That is, the frequency of bias adjusting in the first pixel circuit 11 is equal to the frequency of bias adjusting in the second pixel circuit 12.

In the timing sequence shown in FIG. 24, the operating process of the first pixel circuit 11 in the first display area AA1 includes a writing frame and a holding frame. A first period t0 is the writing frame of the operating cycle of the first display area AA1 in the first operating mode, and a second period t0 is the holding frame of the operating cycle of the first display area AA1 in the first operating mode. During the writing frame, the first pixel circuit 11 executes the data writing phase 1*t*2 once, and writes the data signal to the gate of the driving transistor Tm. During the holding frame, the first pixel circuit 11 does not execute the data writing phase 1*t*2. However, the bias adjusting module 50 is turned on during the holding frame to adjust the bias state of the driving transistor Tm.

As shown in FIG. 23, the bias adjusting module 50 includes a bias adjusting transistor M7. When the bias adjusting transistor M7 is turned on, the bias adjusting signal Vp is written to the driving transistor Tm so as to adjust the bias state of the driving transistor Tm.

Figure 25:
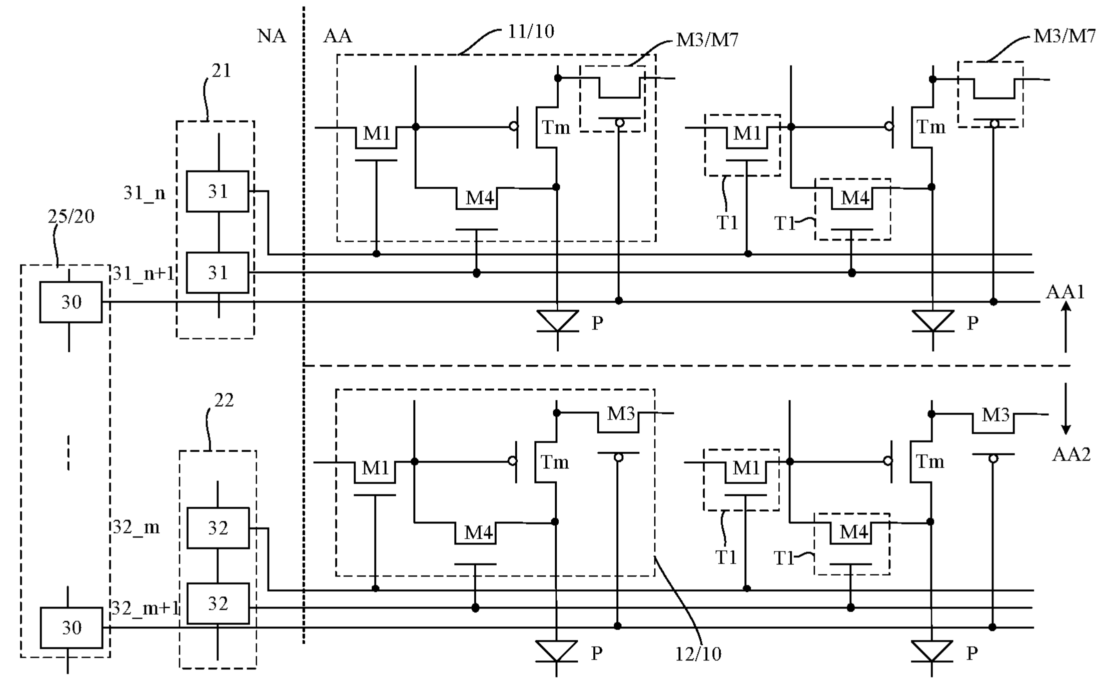
FIG. 25 is another schematic diagram of a local circuit in a display panel according to some embodiments of the present disclosure.

In some embodiments, when the display panel operates in the first operating mode, the data writing transistor M3 in the pixel circuit in the display area having a low refresh frequency is reused as the bias adjusting transistor. FIG. 25 is another schematic diagram of a local circuit in a display panel according to some embodiments of the present disclosure. As shown in FIG. 25, the first transistors T1 include a gate reset transistor M1 and a threshold voltage compensation transistor M4. In the first pixel circuit 11, the gate reset transistor M1 and the threshold voltage compensation transistor M4 are coupled to the first driving circuit 21, and are coupled to two adjacent stages of first shift registers 31 of the first driving circuit 21, respectively. In the second pixel circuit 12, the gate reset transistor M1 and the threshold voltage compensation transistor M4 are coupled to the second driving circuit 22, and are coupled to two adjacent stages of second shift registers 32 of the second driving circuit 22, respectively. The data writing transistor M3 includes silicon, and the threshold voltage compensation transistor M4 includes metal oxide. In the first pixel circuit 11, the gate of the data writing transistor M3 and the gate of the threshold voltage compensation transistor M4 are coupled to different driving circuits. In the second pixel circuit 12, the gate of the data writing transistor M3 and the gate of the threshold voltage compensation transistor M4 are coupled to different driving circuits 20. The pixel circuit 10 in the embodiments can be the pixel circuit provided in the embodiment of FIG. 8.

The driving circuits 20 can include a fifth driving circuit 25. The gate of the data writing transistor M3 in the first pixel circuit 11 and the gate of the data writing transistor M3 in the second pixel circuit 12 are both coupled to the fifth driving circuit 25. The fifth driving circuit 25 is a common driving circuit. In the embodiments, the threshold voltage compensation transistor M4 in the first pixel circuit 11 and the threshold voltage compensation transistor M4 in the second pixel circuit 12 are coupled to different driving circuits; the gate reset transistor M1 in the first pixel circuit 11 and the gate reset transistor M1 in the second pixel circuit 12 are coupled to different driving circuits; and the data writing transistor M3 in the first pixel circuit 11 and the data writing transistor M3 in the second pixel circuit 12 are coupled to a same driving circuit.

Figure 26:
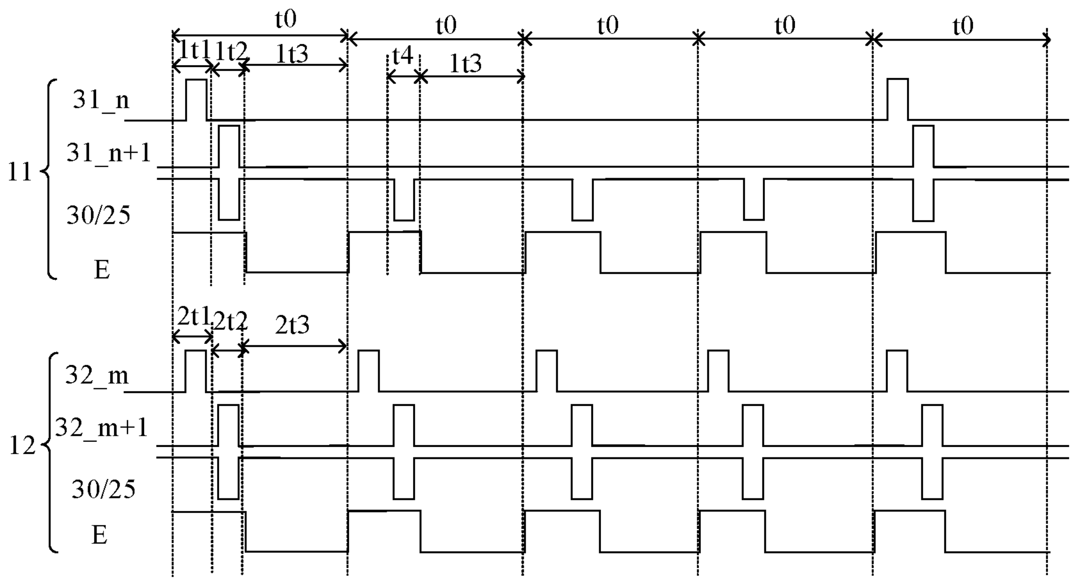
FIG. 26 is a timing sequence of a display panel shown in FIG. 25 according to some embodiments of the present disclosure.

FIG. 26 is a timing sequence of the display panel shown in FIG. 25 according to some embodiments of the present disclosure. As shown in FIG. 26, the frequency at which the enable signal is provided by the first shift register 31 is smaller than the frequency at which the enable signal is provided by the second shift register 32. The first shift register 31 controls the threshold voltage compensation transistor M4 and the gate reset transistor M1 in the first pixel circuit 11, and the second shift register 32 controls the threshold voltage compensation transistor M4 and the gate reset transistor M1 in the second pixel circuit 12.

As shown in FIG. 26, the frequency at which the enable signal (for example, a low level signal as shown in FIG. 26) is provides by the shift register 30 in the fifth driving circuit 25 is greater than the frequency at which the enable signal is provided by the first shift register 31 in the first driving circuit 21. In some embodiments, the frequency at which the enable signal is provided by the shift register 30 in the fifth driving circuit 25 is equal to the frequency at which the enable signal is provided by the second shift register 32 in the second driving circuit 22.

For the first pixel circuit 11, during the first period t0 and the fifth period t0, the operating phases of the first pixel circuit 11 include a gate reset phase 1*t*1, a data writing phase 1*t*2, and a light-emitting phase 1*t*3. During the period t4 of the second period to, the fifth driving transistor 25 turns on the data writing transistor M3 in the first pixel circuit 11. Since the threshold voltage compensation transistor M4 is turned off during the period t4, the potential of the gate of the driving transistor Tm is not affected. During the light-emitting phase 1*t*3 of the second period t0, the first pixel circuit 11 controls the brightness of the light-emitting element P to be equal to the brightness of the light-emitting element P during the first period t0. The first period t0 and the fifth period t0 are the writing frames of the operating process of the first pixel circuit 11. The second period t0, the third period t0, and the fourth period t0 are the holding frames of the operating process of the first pixel circuit 11. During the first to fourth periods t0, the first pixel circuit 11 executes only one data writing phase 1*t*2, and thus the image displayed in the first display area AA1 that is driven by the first pixel circuit 11 can be refreshed only once.

For the second pixel circuit 12, the operating phases of the second pixel circuit 12 include a gate reset phase 2*t*1, a data writing phase 2*t*2, and a light-emitting phase 2*t*3. The second pixel circuit 12 executes one data writing phase 2*t*2 during each period t0, and thus the image displayed by the second display area AA2 that is driven by the second pixel circuit 12 can be refreshed four times.

If the display panel is driven with the timing sequence shown in FIG. 26, the first display area AA1 and the second display area AA2 have different image refresh frequencies, the first display area AA1 is refreshed at a low frequency, and the second display area is refreshed at a high frequency, so that different areas of the display panel display images at different frequencies, thereby reducing the power consumption.

In some embodiments, if the image refresh frequency of the first display area AA1 is smaller than the image refresh frequency of the second display area AA2, the data writing transistor M3 in the first pixel circuit 11 is reused as the bias adjusting transistor M7. As shown in FIG. 26, the first period t0 and the fifth period t0 are the writing frames of the operating process of the first pixel circuit 11, and the second period t0, the third period t0, and the fourth period t0 are the holding frames of the first pixel circuit 11. During the writing frame, the fifth driving circuit 25 controls the data writing transistor M3 to be turned on so as to write the data signal to the gate of the driving transistor Tm. During the holding frame, the data writing transistor M3 is reused as the bias adjusting transistor M7, and the fifth transistor 25 controls the data writing transistor M3 to be turned on so as to write the bias adjusting signal Vp to the first electrode of the driving transistor Tm. The period t4 in the holding frame is the bias adjusting phase.

In the embodiments of FIG. 25, the threshold voltage compensation transistor M4 and the gate reset transistor M1 in the first pixel circuit 11 are coupled to the first driving circuit 21, and the threshold voltage compensation transistor M4 and the gate reset transistor M1 in the second pixel circuit 12 are coupled to the second driving circuit 22, such that the image refresh frequency of the first display area AA1 and the image refresh frequency of the second display area AA2 can be independently controlled. In applications, the first display area AA1 and the second display area AA2 have different image refresh frequencies. For example, in the first operating mode, the first display area AA1 is refreshed at a low frequency, and the second display area AA2 is refreshed at a higher frequency, so that different areas of the display panel display images at different frequencies, thereby reducing the power consumption.

In the embodiments of FIG. 25, the data writing transistor M3 in the first pixel circuit 11 and the data writing transistor M3 in the second pixel circuit 12 are coupled to a same driving circuit, so the turning-on frequency of the data writing transistor M3 in the first pixel circuit 11 is equal to the turning-on frequency of the data writing transistor M3 in the second pixel circuit 12. When the image refresh frequency of the first display area AA1 is smaller than the image refresh frequency of the second display area AA2 in the first operating mode, the operating cycle of the first pixel circuit 11 includes the writing frame and the holding frame, and the data writing transistor M3 is reused as the bias adjusting transistor M7 in the holding frame so as to adjust the bias state of the driving transistor Tm.

It can be understood that when the image refresh frequency of the first display area AA1 is greater than the image refresh frequency of the second display area AA2, the operating cycle of the second pixel circuit 12 includes the writing frame and the holding frame, and the bias state of the driving transistor Tm can be adjusted by the data writing transistor M3 during the holding frame.

In the display panel provided by the embodiments of the present disclosure, when an image is displayed at a low frequency in the display area where the pixel circuits 10 are located, the data writing transistor M3 is reused for adjusting the bias state of the driving transistor Tm, so there is no need to provide an additional bias adjusting transistor in the pixel circuit 10, which saves the routing space in the display area AA. In this way, there is no need to provide an additional driving circuit for the bias adjusting transistor, which saves the routing space in the non-display area NA.

Figure 27:
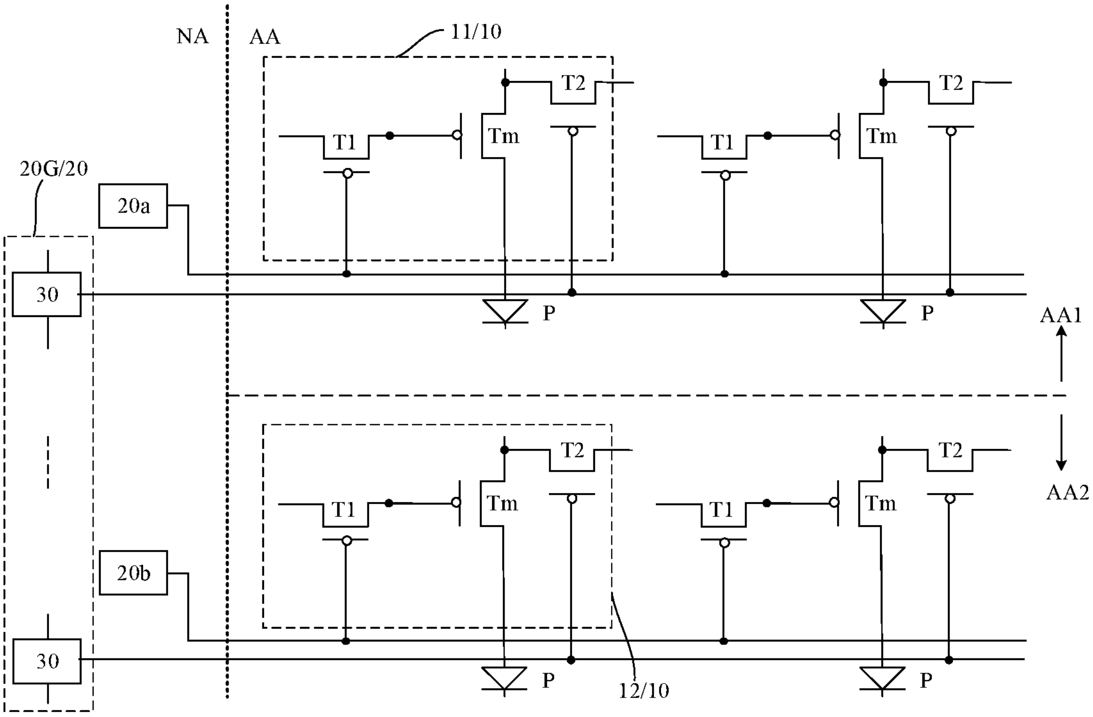
FIG. 27 is another schematic diagram of a local circuit in a display panel according to some embodiments of the present disclosure.

FIG. 27 is another schematic diagram of a local circuit in a display panel according to some embodiments of the present disclosure. In some embodiments, as shown in FIG. 27, the pixel circuit 10 includes a first transistor T1 and a second transistor T2, and the first transistor T1 is coupled to the gate of the driving transistor Tm. The first transistor T1 in the first pixel circuit 11 and the first transistor T1 in the second pixel circuit 12 are coupled to different driving circuits 20. The first transistor T1 in the first pixel circuit 11 is coupled to the driving circuit 20*a*, and the first transistor T1 in the second pixel circuit 12 is coupled to the driving circuit 20*b*. A gate of the second transistor T2 in the first pixel circuit 11 and a gate of the second transistor T2 in the second pixel circuit 12 are both coupled to a common driving circuit 20G. In the embodiments, the potential of the gate of the driving transistor Tm in the first pixel circuit 11 and the potential of the gate of the driving transistor Tm in the second pixel circuit 12 can be independently controlled, such that the first display area AA1 and the second display area AA2 can have different image refresh frequencies. The common driving circuit 20G is provided, and the second transistors T2 in the pixel circuits 10 in the first display area and the second display area are both coupled to the common driving circuit 20G, which can reduce the number of the driving circuits arranged in the non-display area NA and save the space of the non-display area NA.

In some embodiments, the second transistor T2 includes a data writing transistor M3. The common driving circuit 20G includes a first common driving circuit. The data writing transistor M3 in the first pixel circuit 11 and the data writing transistor M3 in the second pixel circuit 12 are both coupled to the first common driving circuit. The fifth driving circuit 25 in the embodiments of FIG. 25 is the first common driving circuit.

In some embodiments, the pixel circuit 10 includes an electrode reset transistor M2. The electrode reset transistor M2 and the data writing transistor M3 are coupled to a same driving circuit, and the electrode reset transistor M2 in the first pixel circuit 11 and the electrode reset transistor M2 in the second pixel circuit 12 are both coupled to the first common driving circuit.

In some embodiments, the second transistor T2 includes a light-emitting control transistors. As shown in FIG. 6 or FIG. 8, the light-emitting control transistors include a first light-emitting control transistor M5 and a second light-emitting control transistor M6. The driving transistor Tm is connected in series between the first light-emitting control transistor M5 and the second light-emitting control transistor M6. The common driving circuit 20G includes a second common driving transistor. The light-emitting control transistors in the first pixel circuit 11 and the light-emitting control transistors in the second pixel circuit 12 are connected to the second common driving circuit.

Figure 28:
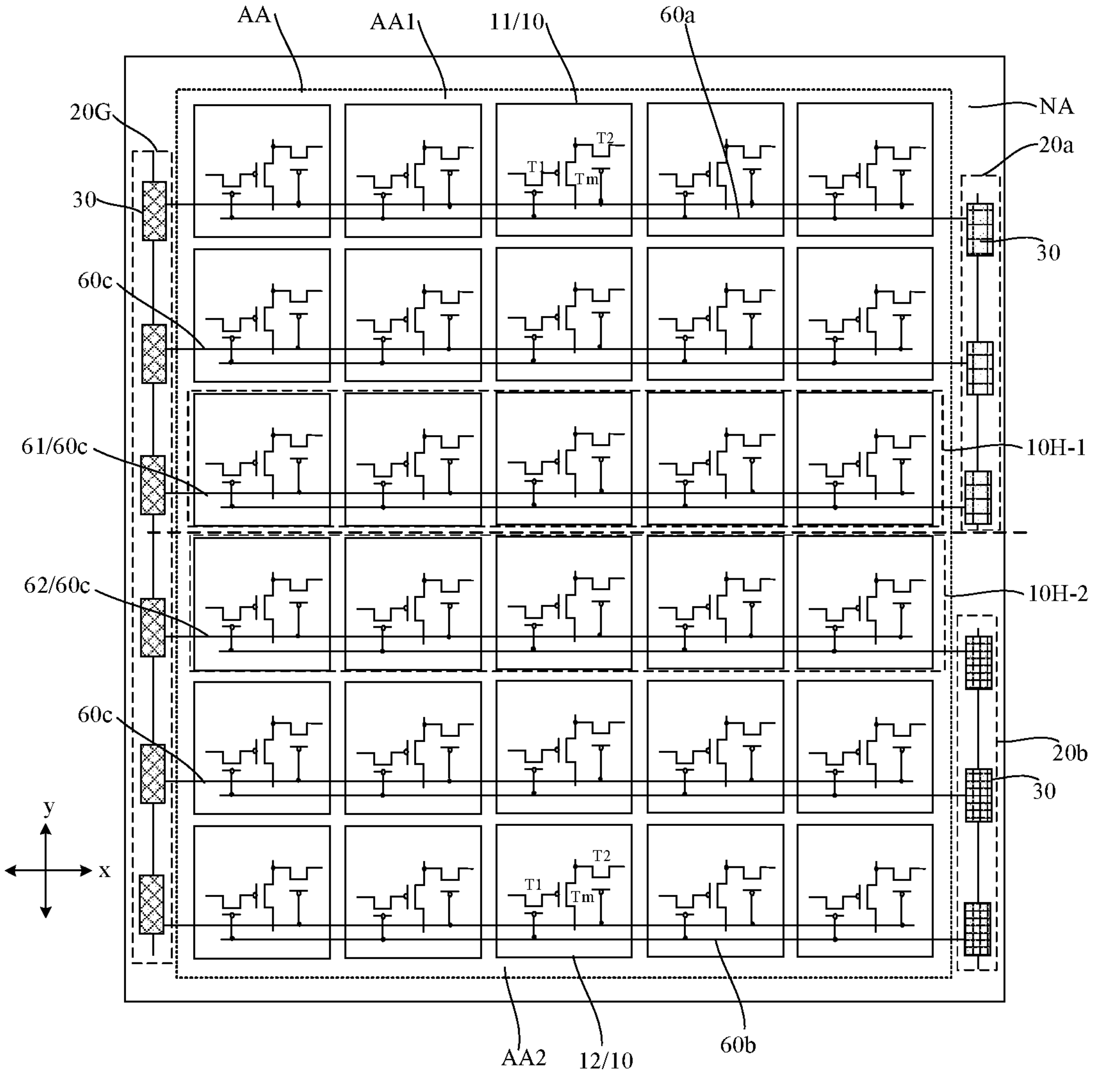
FIG. 28 is another schematic diagram of a display panel according to some embodiments of the present disclosure.

FIG. 28 is another schematic diagram of a display panel according to some embodiments of the present disclosure. In some embodiments, as shown in FIG. 28, the pixel circuits 10 are arranged to form pixel circuit rows, and the pixel circuit row includes at least two pixel circuits 10 arranged in a first direction x. The first display area AA1 and the second display area AA2 are adjacent to each other in a second direction y, and the second direction y intersects with the first direction x. The pixel circuit rows include a first pixel circuit row 10H-1 and a second pixel circuit row 10H-2 adjacent to the first pixel circuit row 10H-1. The first pixel circuit row 10H-1 includes multiple first pixel circuits 11, and the second pixel circuit row 10H-2 includes multiple second pixel circuits 12. FIG. 28 exemplarily illustrates the pixel circuits 10 with blocks. The pixel circuit 10 includes the driving transistor Tm, the first transistor T1, and the second transistor T2. The detailed structure of the pixel circuit 10 can be referred to the above embodiments. The first pixel circuit row 10H-1 and the second pixel circuit row 10H-2 are close to the boundary between the first display area AA1 and the second display area AA2.

The display panel can includes selecting lines. The pixel circuits 10 are coupled to the corresponding driving circuits 20 through the selecting lines. The selecting lines include a first-type selecting line 60*a*, a second-type selecting line 60*b*, and a third-type selecting line 60*c*. The driving circuits 20 in the non-display area NA include a driving circuit 20*a*, a driving circuit 20*b*, and a common driving circuit 20G. Each driving circuit includes cascaded shift registers 30. The first-type selecting line 60*a* is electrically connected to the driving circuit 20*a*. The second type selecting line 60*b* is coupled to the driving circuit 20*b*. The third type selecting line 60*c* is coupled to the driving circuit 20G.

The first transistor T1 in the first pixel circuit 11 is coupled to the driving circuit 20*a* through the first-type selecting line 60*a*. The first transistor T1 in the second pixel circuit 12 is coupled to the driving circuit 20*b* through the second-type selecting line 60*b*. With such configuration, the potential of the gate of the driving transistor Tm in the first pixel circuit 11 and the potential of the gate of the driving transistor Tm in the second pixel circuit 12 can be independently controlled, such that the first display area AA1 and the second display area AA2 have different image refresh frequencies.

The second transistor T2 in the first pixel circuit 11 and the second transistor T2 in the second pixel circuit 12 are both coupled to the common driving circuit 20G through the third-type selecting lines 60*c*. The third-type selecting line 60*c* includes a first selecting line 61 and a second selecting line 62. The second transistor T2 in the first pixel circuit 11 in the first pixel circuit row 10H-1 is coupled to the first selecting line 61. The second transistor T2 in the second pixel circuit 12 in the second pixel circuit row 10H-2 is coupled to the second selecting line 62. The first selecting line 61 and the second selecting line 62 are respectively connected to two cascaded shift registers 30 in the common driving circuit 20G, such that the second transistor T2 in the first pixel circuit row 10H-1 and the second transistor T2 in the second pixel circuit row 10H-2 are driven in a cascaded manner, which can reduce the number of the driving circuits in the non-display area NA and save the space of the non-display area NA.

FIG. 28 illustrates the display area AA is divided into the first display area AA1 and the second display area AA2 in a first manner. Taking a conventional rectangular display panel as an example, a shorter side of the rectangular display panel extends along the first direction x, a longer side of the rectangular display panel extends along the second direction y, and the first display area AA1 and the second display area AA2 are arranged in the second direction y. In an application scenario in which the display panel displays an image in a portrait mode, the first display area AA1 and the second display area AA2 are an upper area and a lower area, respectively. In an application scenario in which the display panel displays an image in a landscape mode, the first display area AA1 and the second display area AA2 are divided into a left area and a right area, respectively. The first display area AA1 and the second display area AA2 can have different image refresh frequencies by employing the design of embodiments of the present disclosure. In a display mode, the image refresh frequency of the first display area AA1 is greater than the image refresh frequency of the second display area AA2. In another display mode, the image refresh frequency of the first display area AA1 is smaller than the image refresh frequency of the second display area AA2. The display panel provided by embodiments of the present disclosure can meet the display demands for various application scenarios.

Figure 29:
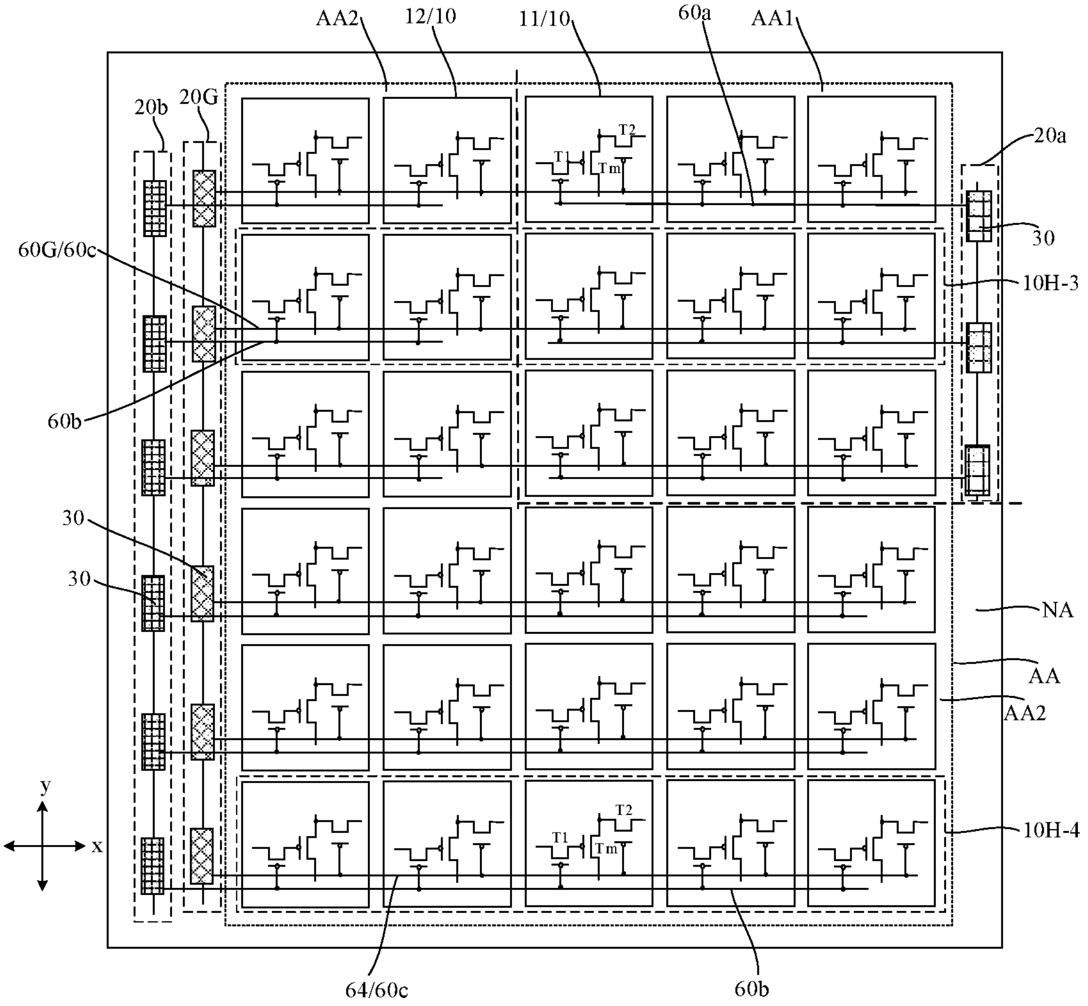
FIG. 29 is another schematic diagram of a display panel according to some embodiments of the present disclosure.

FIG. 29 is another schematic diagram of a display panel according to some embodiments of the present disclosure. In some embodiments, as shown in FIG. 29, the pixel circuits 10 are arranged to form pixel circuit rows, and the pixel circuit row includes at least two pixel circuits 10 arranged in a first direction x. The first display area AA1 and the second display area AA2 are adjacent to each other in the first direction x. The pixel circuit rows include a third pixel circuit row 10H-3, and the third pixel circuit row includes multiple first pixel circuits 11 and multiple second pixel circuits 12.

The display panel can include selecting lines. The pixel circuits 10 are coupled to the corresponding driving circuits 20 through the selecting lines. The selecting lines includes a first-type selecting line 60*a*, a second-type selecting line 60*b*, and a third-type selecting line 60*c*. The driving circuits 20 in the non-display area NA include a driving circuit 20*a*, a driving circuit 20*b*, and a common driving circuit 20G. Each driving circuit includes cascaded shift registers 30. The first-type selecting line 60*a* is coupled to the driving circuit 20*a*. The second-type selecting line 60*b* is coupled to the driving circuit 20*b*. The third-type selecting line 60*c* is coupled to the common driving circuit 20G.

The first transistor T1 in the first pixel circuit 11 is electrically connected to the driving circuit 20*a* through the first-type selecting line 60*a*. The first transistor T1 in the second pixel circuit 12 is coupled to the driving circuit 20*b* through the second-type selecting line 60*b*. The third-type selecting line 60*c* includes a common selecting line 60G. In the third pixel circuit row 10H-3, the second transistor T2 in the first pixel circuit 11 and the second transistor T2 in the second pixel circuit 12 are both coupled to the common selecting line 60G, and the common selecting line 60G has an end coupled to the common driving circuit 20G.

As shown in FIG. 29, the pixel circuit rows can include a fourth pixel circuit row 10H-4 in the second display area AA2. The fourth pixel circuit row 10H-4 includes multiple second pixel circuits 12. The third-type selecting line 60*c* includes a fourth selecting line 64. The second transistor T2 in the fourth pixel circuit row 10H-4 is coupled to the common driving circuit 20G through the fourth selecting line 64.

In the embodiments, the third pixel circuit row 10H-3 includes both the first pixel circuit 11 and the second pixel circuit 12, and the third pixel circuit row 10H-3 is driven by the common driving circuit 20G, such that the number of the driving circuits arranged in the non-display area NA, and the space of the non-display area AA is saved.

FIG. 29 illustrates that the display area AA is divided into the first display area AA1 and the second display area AA2 in a second manner. In the embodiments of FIG. 29, the second display area AA2 semi-surrounds the first display area AA1, and the first display area AA1 is located at a corner of the display area AA.

In other embodiments, the pixel circuits 10 in the display area AA are arranged in the first direction x to form a pixel circuit row, and the second direction y intersects with the first direction x. Two edges of the first display area AA1 that are arranged in the first direction are both adjacent to the second display area AA2, and one edge of the first display area AA1 in the second direction y is also adjacent to the second display area AA2, which is not illustrated in figures.

Figure 30:
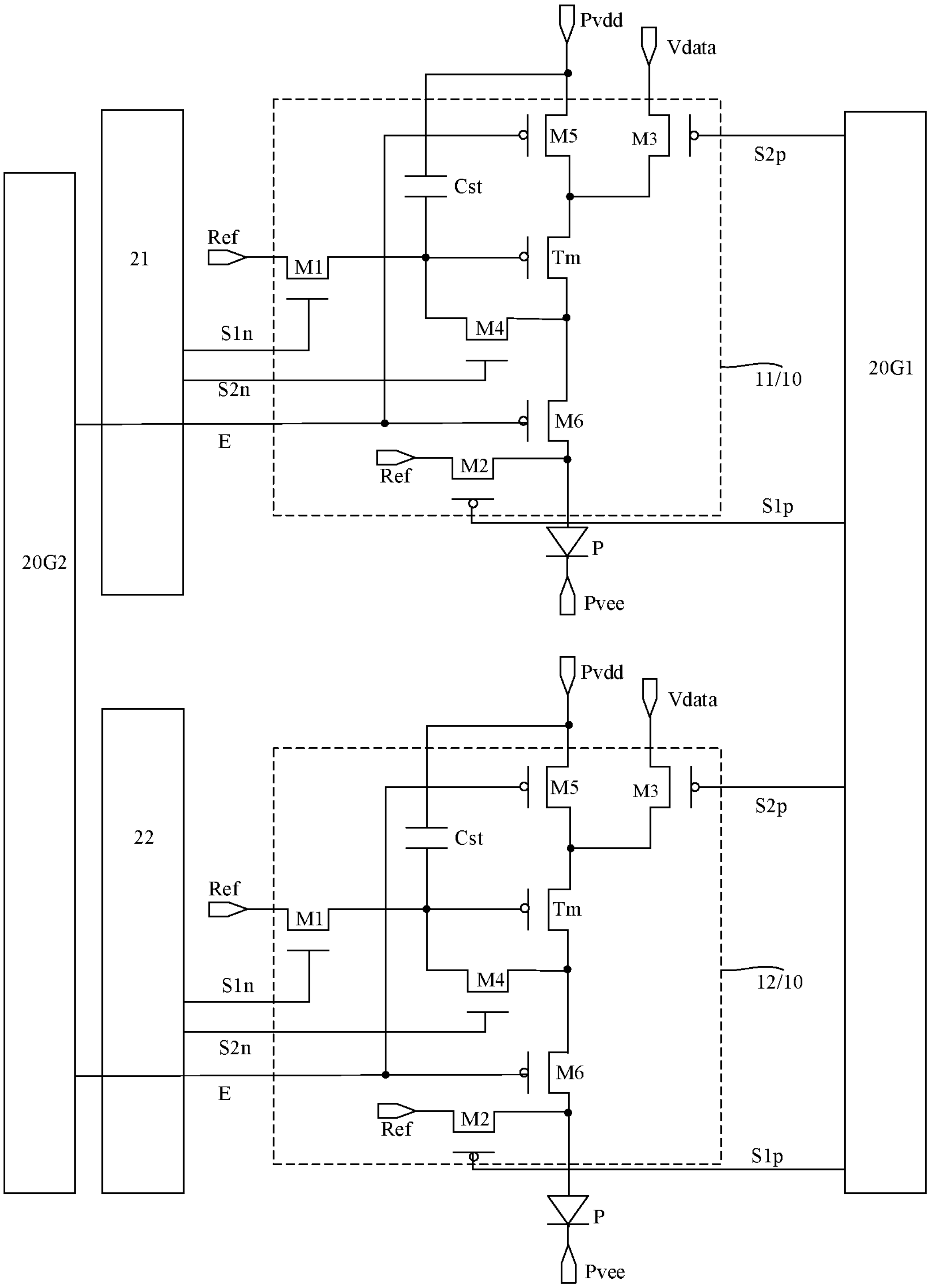
FIG. 30 is another schematic diagram of a display panel according to some embodiments of the present disclosure.

FIG. 30 is another schematic diagram of a display panel according to some embodiments of the present disclosure. The pixel circuit in FIG. 30 can be referred to the pixel circuit shown in FIG. 8. The operating principle of the pixel circuit 10 can be referred to the above description, which is not repeated herein. In some embodiments, as show in FIG. 30, the driving circuits of the display panel include a first driving circuit 21, a second driving circuit 22, a first common driving circuit 20G1, and a second common driving circuit 20G2.

The gate reset transistor M1 and the threshold voltage compensation transistor M4 in the first pixel circuit 11 are coupled to the first driving circuit 21. The gate reset transistor M1 and the threshold voltage compensation transistor M4 in the second pixel circuit 12 are coupled to the second driving circuit 22. The data writing transistor M3 and the electrode reset transistor M2 in the first pixel circuit 11, and the data writing transistor M3 and the electrode reset transistor M2 in the second pixel circuit 12 are all coupled to the first common driving circuit 20G1. The first light-emitting control transistor M5 and the second light-emitting control transistor M6 in the first pixel circuit 11, and the first light-emitting control transistor M5 and the second light-emitting control transistor M6 in the second pixel circuit 12 are all coupled to the second common driving circuit 20G2.

In the embodiments of FIG. 30, the gate reset transistor M1 and the threshold voltage compensation transistor M4 in the first pixel circuit 11 are controlled by the first driving circuit 21, and the gate reset transistor M1 and the threshold voltage compensation transistor M4 in the second pixel circuit 12 are controlled by the second driving circuit 22, such that the potential of the gate of the driving transistor Tm in the first driving circuit 11 and the potential of the gate of the driving transistor Tm in the second driving circuit 12 can be independently controlled. As a result, the first display area AA1 and the second display area AA2 can have different image refresh frequencies. One of the first display area AA1 and the second display area AA2 is refreshed at a high frequency, and the other one of the first display area AA1 and the second display area AA2 is refreshed at a low frequency, so that different areas of the display panel display images at different frequencies, thereby reducing the power consumption. In conjunction with the embodiments shown in FIG. 25 and FIG. 26, the data writing transistor M3 in the first pixel circuit 11 and the data writing transistor M3 in the second pixel circuit 12 are driven by the first common driving circuit 20G1. In this way, during the holding frame of the first display area AA1 or the second display area AA2 during which the first display area AA1 or the second display area AA2 operates at a low refresh frequency, the data writing transistor M3 can be reused as the bias adjusting transistor to adjust the bias state of the driving transistor Tm. Therefore, there is no need to provide an additional bias adjusting transistor in the pixel circuit, saving the routing space in the display area AA. There is no need to provide an additional driving circuit for the bias adjusting transistor, saving the routing space in the non-display area NA.

Figure 31:
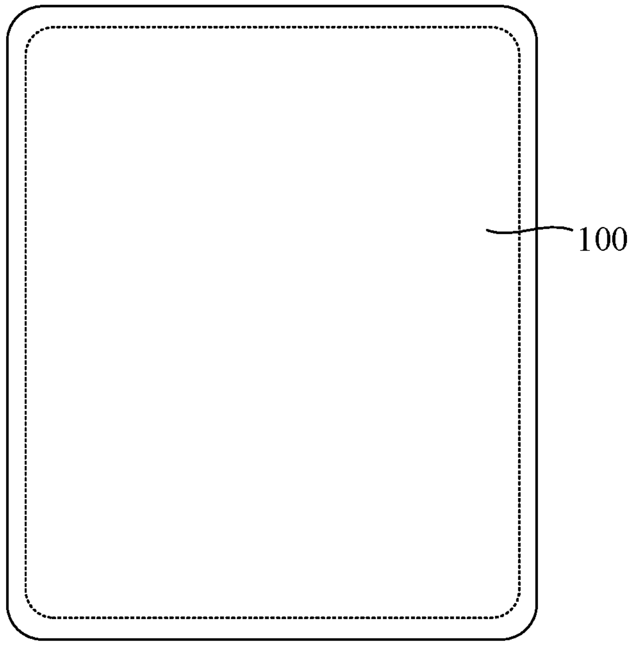
FIG. 31 is a schematic diagram of a display apparatus according to some embodiments of the present disclosure.

Some embodiments of the present disclosure provide a display apparatus. FIG. 31 is a schematic diagram of a display apparatus according to some embodiments of the present disclosure. As shown in FIG. 31, the display apparatus includes the above display panel 100. The structure of the display panel 100 has been explained in the above embodiments, which will not be repeated herein. The display apparatus shown in FIG. 31 is for exemplary illustration. The display apparatus can be any electrical device with a display function, such as a mobile phone, a computer, a TV, a tablet, a smart wearable device, or the like.

Figure 32:
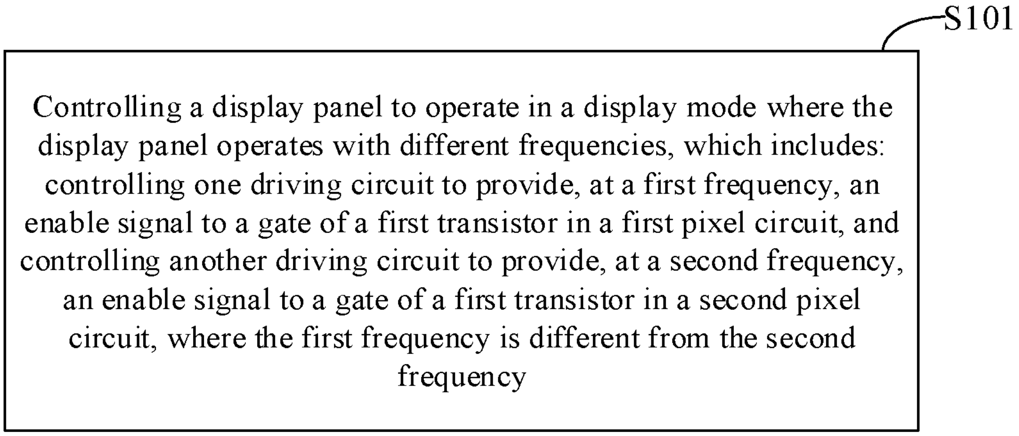
FIG. 32 is a flow chart of a method for driving a display panel according to some embodiments of the present disclosure.

Some embodiments of the present disclosure provide a method for driving a display panel. The method for driving the display panel of the embodiments can be understood in conjunction with the above embodiments of the display panel. FIG. 32 is a flow chart of a method for driving a display panel according to some embodiments of the present disclosure. As shown in FIG. 32, the method for driving the display panel includes step S101.

At step S101, the display panel is controlled to operate in a display mode where different areas of the display panel displays an image at different frequencies. The controlling the display panel to operate in the display mode where different areas of the display panel displays the image at different frequencies includes: controlling a driving circuit 20 to provide, at a first frequency, an enable signal to the gate of the first transistor T1 in the first pixel circuit 11, and controlling another driving circuit 20 to provide, at a second frequency, the enable signal to the first transistor T1 in the second pixel circuit 12. The first frequency is different from the second frequency. In some embodiments, the first transistor T1 includes at least one of the gate reset transistor or the threshold voltage compensation transistor.

In the method for driving the display panel provided by the embodiments of the present disclosure, the enable signals are provided to the first transistor T1 in the first pixel circuit 11 and the first transistor T1 in the second pixel circuit 12 at different frequencies and by different driving circuits 20, respectively, such that the potential of the gate of the driving transistor Tm in the first pixel circuit 11 and the potential of the gate of the driving transistor Tm in the second pixel circuit 12 can be controlled independently of each other. It can be achieved that the first display area AA1 and the second display area AA2 have different image refresh frequencies, so that different areas of the display panel display images at different frequencies, thereby reducing the power consumption.

In some embodiments, the pixel circuit further includes a data writing transistor M3, and the gate of the data writing transistor M3 in the first pixel circuit 11 and the gate of the data writing transistor M3 in the second pixel circuit 12 are coupled to different driving circuits, respectively. As described in the embodiments of FIG. 13, the gate of the data writing transistor M3 in the first pixel circuit 11 is coupled to the first driving circuit 21, the gate of the data writing transistor M3 in the second pixel circuit 12 is coupled to the second driving circuit 22, and the data writing transistor M3 and the threshold voltage compensation transistor M4 in a same pixel circuit are coupled to a same driving circuit. In other embodiments, the gate of the data writing transistor M3 in the first pixel transistor 11 and the gate of the data writing transistor M3 in the second pixel transistor 12 are coupled to different driving transistors, and the data writing transistor M3 and the threshold voltage compensation transistor M4 in the pixel circuit are coupled to different driving circuits. FIG. 33 is a flow chart of another method for driving a display panel according to some embodiments of the present disclosure. As shown in FIG. 33, in the method for driving the display panel, the controlling the display panel to operate in the display mode where different areas of the display panel displays the image at different frequencies includes: step S201.

At step S201, one driving circuit 20 is controlled to provide, at the first frequency, the enable signal to the gate of the first transistor T1 in the first pixel circuit 11, and another driving circuit 20 is controlled to provide, at the second frequency, the enable signal to the gate of the first transistor T1 in the second pixel circuit 12; and the one driving circuit 20 is controlled to provide, at the first frequency, the enable signal to the data writing transistor M3 in the first pixel circuit 11, and the another driving circuit 20 is controlled to provide, at the second frequency, the enable signal to the gate of the data writing transistor M3 in the second pixel circuit 12.

In the method driving for driving the display panel provided by the embodiments, the enable signals are provided to the data writing transistor M3 in the first pixel circuit 11 and the data writing transistor M3 in the second pixel circuit 12 by different driving circuits 20 at different frequencies, respectively, such that the data writing phase of the first pixel circuit 11 and the data writing phase of the second pixel circuit 12 can be controlled independently of each other. It can be achieved that the frequency at which the data is written to the first pixel circuit 11 is different from the frequency at which the data is written to the second pixel circuit 12, such that the first display area AA1 and the second display area AA2 have different image refresh frequencies, thereby achieving that different areas of the display panel display images at different frequencies to reduce the power consumption.

In some embodiments, as shown in FIG. 27, the pixel circuit includes a second transistor T2, and the driving circuits 20 include a common driving transistor 20G. The gate of the second transistor T2 in the first pixel circuit 11 and the gate of the second transistor T2 in the second pixel circuit 12 are both coupled to the common driving circuit 20G. FIG. 34 is a flow chart of a method for driving a display panel according to some embodiments of the present disclosure. As shown in FIG. 34, the controlling the display panel to operate in the display mode where different areas of the display panel displays the image at different frequencies includes: step S301.

At step S301, one driving circuit 20 is controlled to provide, at the first frequency, the enable signal to the gate of the first transistor T1 in the first pixel circuit 11, and another driving circuit 20 is controlled to provide, at the second frequency, the enable signal to the gate of the first transistor T1 in the second pixel circuit 12; and the common driving circuit 20G is controlled to provide, at the third frequency, the enable signal to the gate of the second transistor T2 in the first pixel circuit 11 and the gate of the second transistor T2 in the second pixel circuit 12, where the third frequency is the greater one of the first frequency and the second frequency.

In the method for driving the display panel provided by the embodiments, the enable signals are provided to the first transistor T1 in the first pixel circuit 11 and the first transistor T1 in the second pixel circuit 12 by different driving circuits 20 at different frequencies, respectively, such that the potential of the gate of the driving transistor Tm in the first pixel circuit 11 and the potential of the gate of the driving transistor Tm in the second pixel circuit 12 can be controlled independently of each other. It can be achieved that the first display area AA1 and the second display area AA2 have different image refresh frequencies, thereby achieving that different areas of the display panel display images at different frequencies to reduce the power consumption. The second transistor T2 in the first pixel circuit 11 and the second transistor T2 in the second pixel circuit 12 are both controlled by the common driving circuit 20G, which can reduce the number of the driving circuits in the non-display area NA and save the space of the non-display area NA.

Figure 35:
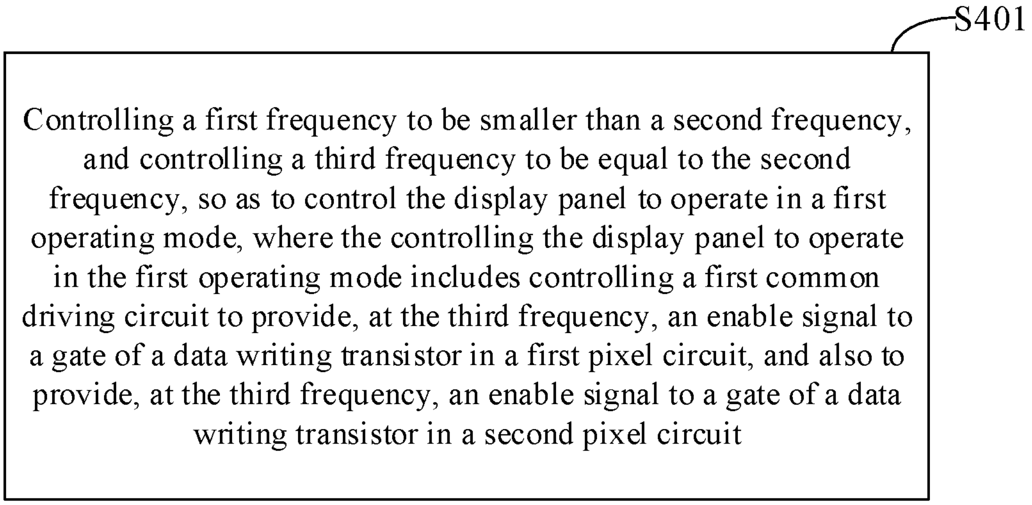
FIG. 35 is another flow chart of a method for driving a display panel according to some embodiments of the present disclosure.

In some embodiments, as shown in FIG. 30, the second transistor T2 includes the data writing transistor M3, and the common driving circuit includes a first common driving circuit 20G1. The gate of the data writing transistor M3 in the first pixel circuit 11 and the gate of the data writing transistor M3 in the second pixel circuit 12 are both coupled to the first common driving circuit 20G1. In some embodiments, as shown in FIG. 25, the gate of the data writing transistor M3 in the first pixel circuit 11 and the gate of the data writing transistor M3 in the second pixel circuit 12 are both coupled to the fifth driving circuit 25. The fifth driving circuit 25 is the first common driving circuit 20G1. The split-screen display with different frequencies of the display panel provided by the embodiments of the present disclosure includes a first operating mode. In the first operating mode, the image refresh frequency of the first display area AA1 is smaller than the image refresh frequency of the second display area AA2. FIG. 35 is a flow chart of another method for driving a display panel according to some embodiments of the present disclosure. As shown in FIG. 35, the controlling the display panel to operate in the display mode where different areas of the display panel displays the image at different frequencies includes step S401.

At step S401, the first frequency is controlled to be smaller than the second frequency, and the third frequency is controlled to be equal to the second frequency, so as to control the display panel to operate in a first operating mode. The controlling the display panel to operate in the first operating mode includes controlling the first common driving circuit 20G1 to provide, at the third frequency, the enable signal to the gate of the data writing transistor M3 in the first pixel circuit 11, and also to provide, at the third frequency, the enable signal to the gate of the data writing transistor M3 in the second pixel circuit.

With the method for driving the display panel provided by embodiments of the present disclosure, it can be achieved that the image refresh frequency of the first display area AA1 is smaller than the image refresh frequency of the second display area AA2, thereby achieving that different areas of the display panel displays an image at different frequencies to reduce the power consumption.

In some embodiments, with reference to the embodiments of FIG. 25 and FIG. 26, in the first operating mode, the operating cycle of the first pixel circuit 11 includes an writing frame and a holding frame, and the step of providing, at the third frequency, the enable signal to the gate of the data writing transistor M3 in the first pixel circuit 11 includes:

during the writing frame, controlling the data writing transistor M3 to be turned on so as to write the data signal to the gate of the driving transistor Tm; and during the holding frame, controlling the data writing transistor M3 to be turned on to write the bias adjusting signal to the first electrode of the driving transistor Tm so as to adjust the bias state of the driving transistor Tm.

With the method for driving the display panel provided by embodiments provided by the present disclosure, it can be achieved that the image refresh frequency of the first display area AA1 is smaller than the image refresh frequency of the second display area AA2, so that different areas of the display panel display images at different frequencies, thereby reducing the power consumption. When the pixel circuit which drives the display area to display an image at a low frequency is operating, the data writing transistor M3 is reused to adjust the bias state of the driving transistor Tm, so there is no need to provide an additional bias adjusting transistor in the pixel circuit 10, saving the routing space in the display area AA. There is no need to provide an additional driving circuit for the bias adjusting transistor, saving the routing space in the non-display area NA.

In the above embodiments, the driving manner is illustrated as the first operating mode where different areas of the display panel displays the image at different frequencies. In the first operating mode, the image refresh frequency of the first display area AA1 is smaller than the image refresh frequency of the second display area AA2. In the embodiments of the present disclosure, the display mode where the display mode where different areas of the display panel displays the image at different frequencies includes a second operating mode. In the second operating mode, the image refresh frequency of the first display area AA1 is greater than the image refresh frequency of the second display area AA2. With reference to the above embodiments, it can be understood that, by controlling the frequency of providing the enable signal to the first transistor T1 in the first pixel circuit 11 to be greater than the frequency of providing the enable signal to the first transistor T1 in the second pixel circuit 12, the image refresh frequency of the first display area AA1 is controlled to be greater than the image refresh frequency of the second display area AA2. The method for driving the display panel can be understood with reference to the method for driving the display panel described in the above embodiments, which is not repeated herein.

The above only illustrates some embodiments and does not limit the technical solutions of the present disclosure. Any modification, equivalent replacement, improvement, etc. made within the principle of this disclosure shall fall within the scope of disclosure.

Finally, it should be noted that, the above-described embodiments are merely illustrating the present disclosure. Although the present disclosure has been described in detail with reference to the above-described embodiments, it should be understood by those skilled in the art that it is still possible to modify the technical solutions described in the above embodiments or to equivalently replace some or all of the technical features therein, but these modifications or replacements do not cause the corresponding technical solutions to depart from the scope of the present disclosure.

What is claimed is:

1. A display panel, having a display area and a non-display area, the display area comprising a first display area and a second display area, and the display panel comprising:

light-emitting elements located in the display area;

pixel circuits located in the display area, each of the pixel circuits comprising a driving transistor, a threshold voltage compensation transistor, a gate reset transistor, and a bias adjusting transistor, wherein a first electrode of the driving transistor is electrically connected to the bias adjusting transistor, a second electrode of the driving transistor is electrically connected to a corresponding one of the light-emitting elements and a first electrode of the threshold voltage compensation transistor, and a gate of the driving transistor is electrically connected to the gate reset transistor and a second electrode of the threshold voltage compensation transistor;

a first driving circuit; and a second driving circuit, wherein the light-emitting elements comprises first light-emitting elements located in the first display area and second light-emitting elements located in the second display area, and the pixel circuits comprise first pixel circuits electrically connected to the first light-emitting elements and second pixel circuits electrically connected to the second light-emitting elements, gates of the threshold voltage compensation transistors and gates of the gate reset transistors in the first pixel circuits are connected to the first driving circuit, and gates of the threshold voltage compensation transistors and gates of the gate reset transistors in the second pixel circuits are connected to the second driving circuit, the first driving circuit comprises a plurality of cascaded first shift registers, and the second driving circuit comprises a plurality of cascaded second shift registers, the first pixel circuits comprise a first pixel circuit, in which, the gate of the gate reset transistor is connected to an n-th stage first shift register of the first driving circuit, and the gate of the threshold voltage compensation transistor is connected to an (n+1)-th stage first shift register of the first driving circuit, where n is a positive integer, the second pixel circuits comprise a second pixel circuit, in which, the gate of the gate reset transistor is connected to an m-th stage second shift register of the second driving circuit, the gate of the threshold voltage compensation transistor is connected to an (m+1)-th stage second shift register of the second driving circuit, where m is a positive integer, when the gate reset transistor in the first pixel circuit is turned on, the gate reset transistor in the second pixel circuit is also turned on, and when the threshold voltage compensation transistor in the first pixel circuit is turned on, the threshold voltage compensation transistor in the second pixel circuit is also turned on.

2. The display panel according to claim 1, wherein the gate reset transistor and the threshold voltage compensation transistor both comprise metal oxide.

3. The display panel according to claim 1, wherein the display panel has a first working mode, wherein in the first working mode, an image refresh frequency in the first display area is smaller than an image refresh frequency in the second display area, the first driving circuit is configured to provide a first enable signal, the second driving circuit is configured to provide a second enable signal, wherein the first enable signal has a frequency smaller than a frequency of the second enable signal.

4. The display panel according to claim 3, wherein each of the first pixel circuits further comprises a bias adjusting module coupled to the driving transistor of the first pixel circuit; and wherein in the first working mode, a working cycle of each of the first pixel circuits comprises a writing frame and a holding frame, wherein a data signal is written to the gate of the driving transistor during the writing frame, and the bias adjusting module is turned on to adjust a bias state of the driving transistor during the holding frame.

5. The display panel according to claim 4, wherein the bias adjusting module comprises a bias adjusting transistor, each of the pixel circuits further comprises a data writing transistor coupled to a first electrode of the driving transistor;

wherein the data writing transistor is turned on to write the data signal to the gate of the driving transistor during the writing frame; and wherein, during the holding frame, the data writing transistor is reused as the bias adjusting transistor, the data writing transistor is turned on to write a bias adjusting signal to the first electrode of the driving transistor to adjust the bias state of the driving transistor.

6. The display panel according to claim 5, further comprising a first common driving circuit, wherein a gate of the data writing transistor in the first pixel circuit and a gate of the data writing transistor in the second pixel circuit are both coupled to the first common driving circuit.

7. The display panel according to claim 4, wherein each of the second pixel circuits further comprises a bias adjusting module, and the display panel further comprises a second common driving circuit, wherein the bias adjusting module in the first pixel circuit and the bias adjusting module in the second pixel circuit are both coupled to the second common driving circuit.

8. The display panel according to claim 1, wherein each of the pixel circuits further comprises at least one second transistor, and the display panel further comprises at least one common driving circuit, wherein a gate of one second transistor of the at least one second transistor in the one first pixel circuit and a gate of one second transistor of the at least one second transistor in the one second pixel circuit are both connected to one common driving circuit of the at least one common driving circuit.

9. The display panel according to claim 8, further comprising:

selecting lines comprising a first selecting line and a second selecting line, wherein the pixel circuits form pixel circuit rows, wherein each pixel circuit row of the pixel circuit rows comprises at least two pixel circuits of the pixel circuits that are arranged in a first direction;

wherein the first display area is adjacent to the second display area in a second direction, and the second direction intersects with the first direction;

wherein the pixel circuit rows comprise a first pixel circuit row and a second pixel circuit row adjacent to the first pixel circuit row, wherein the first pixel circuit row comprises at least two first pixel circuits of the first pixel circuits, and the second pixel circuit row comprises at least two second pixel circuits of the second pixel circuits;

wherein the second transistors of at least two first pixel circuits of the first pixel circuits in the first pixel circuit row are coupled to the first selecting line, and the second transistors of at least two second pixel circuits of the second pixel circuits in the second pixel circuit row are coupled to the second selecting line; and wherein the first selecting line is coupled to one shift register of two cascaded shift registers in one common driving circuit of the at least one common driving circuit, and the second selecting line is coupled to the other shift register of the two cascaded shift registers in the one common driving circuit.

10. The display panel according to claim 8, further comprising:

selecting lines comprising a common selecting line, wherein the pixel circuits form pixel circuit rows, wherein each pixel circuit row of the pixel circuit rows comprises at least two pixel circuits of the pixel circuits that are arranged in a first direction;

wherein the pixel circuit rows comprise a third pixel circuit row, wherein the third pixel circuit row comprises at least two first pixel circuits of the first pixel circuits and at least two second pixel circuits of the second pixel circuits;

wherein one second transistor of the at least one second transistor in one first pixel circuit of the at least two first pixel circuits in the third pixel circuit row and one second transistor of the at least one second transistor in one second pixel circuit of the at least two second pixel circuits in the third pixel circuit row are both connected to the common selecting line, and the common selecting line has a terminal coupled to one common driving circuit of the at least one common driving circuit.

11. The display panel according to claim 8, wherein the at least one second transistor comprises at least one of a data writing transistor or a light-emitting control transistor, and the at least one common driving circuit comprises at least one of a first common driving circuit or a second common driving circuit;

wherein the data writing transistor is coupled to a first electrode of the driving transistor, and the data writing transistor in one first pixel circuit of the first pixel circuits and the data writing transistor in one second pixel circuit of the second pixel circuits are both coupled to the first common driving circuit; and wherein the light-emitting control transistor and the driving transistor are connected in series, and the light-emitting control transistor in one first pixel circuit of the first pixel circuits and the light-emitting control transistor in one second pixel circuit of the second pixel circuits are both coupled to the second common driving circuit.

12. A method for driving a display panel, wherein the display panel has a display area and a non-display area, wherein the display area comprises a first display area and a second display area;

wherein the display panel comprises:

light-emitting elements located in the display area;

pixel circuits located in the display area, each of the pixel circuits comprising a driving transistor, a threshold voltage compensation transistor, a gate reset transistor, and a bias adjusting transistor, wherein a first electrode of the driving transistor is electrically connected to the bias adjusting transistor, a second electrode of the driving transistor is electrically connected to a corresponding one of the light-emitting elements and a first electrode of the threshold voltage compensation transistor, and a gate of the driving transistor is electrically connected to the gate reset transistor and a second electrode of the threshold voltage compensation transistor;

a first driving circuit; and a second driving circuit, wherein the light-emitting elements comprises first light-emitting elements located in the first display area and second light-emitting elements located in the second display area, and the pixel circuits comprise first pixel circuits electrically connected to the first light-emitting elements and second pixel circuits electrically connected to the second light-emitting elements, gates of the threshold voltage compensation transistors and gates of the gate reset transistors in the first pixel circuits are connected to the first driving circuit, and gates of the threshold voltage compensation transistors and gates of the gate reset transistors in the second pixel circuits are connected to the second driving circuit, the first driving circuit comprises a plurality of cascaded first shift registers, and the second driving circuit comprises a plurality of cascaded second shift registers, the first pixel circuits comprise a first pixel circuit, in which, the gate of the gate reset transistor is connected to an n-th stage first shift register of the first driving circuit, and the gate of the threshold voltage compensation transistor is connected to an (n+1)-th stage first shift register of the first driving circuit, where n is a positive integer, the second pixel circuits comprise a second pixel circuit, in which, the gate of the gate reset transistor is connected to an m-th stage second shift register of the second driving circuit, the gate of the threshold voltage compensation transistor is connected to an (m+1)-th stage second shift register of the second driving circuit, where m is a positive integer, when the gate reset transistor in the first pixel circuit is turned on, the gate reset transistor in the second pixel circuit is also turned on, and when the threshold voltage compensation transistor in the first pixel circuit is turned on, the threshold voltage compensation transistor in the second pixel circuit is also turned on, wherein the method comprises:

controlling the display panel to operate in a display mode where the display panel operates at different frequencies, wherein said controlling the display panel to operate in the display mode where the display panel operates at different frequencies comprises:

controlling the first driving circuit to provide, at a first frequency, an enable signal to the gate of the first transistor in the first pixel circuit, and controlling the second driving circuit to provide, at a second frequency, an enable signal to the gate of the first transistor in the second pixel circuit, wherein the first frequency is different from the second frequency.

13. The method according to claim 12, wherein each of the pixel circuits further comprises a data writing transistor coupled to a first electrode of the driving transistor, wherein the data writing transistor in the first pixel circuit and the data writing transistor in the second pixel circuit are coupled to a third driving circuit and a fourth driving circuit, respectively; and wherein said controlling the display panel to operate in the display mode where the display panel operates at different frequencies further comprises:

controlling the third driving circuit to provide, at the first frequency, an enable signal to a gate of the data writing transistor in the first pixel circuit, and controlling the fourth driving circuit to provide, at the second frequency, an enable signal to a gate of the data writing transistor in the second pixel circuit.

14. The method according to claim 13, wherein each of the pixel circuits further comprises at least one second transistor, and the display panel further comprises at least one common driving circuit, wherein a gate of one second transistor of the at least one second transistor in the first pixel circuit and a gate of one second transistor of the at least one second transistor in the second pixel circuit are both coupled to one common driving circuit of the at least one common driving circuit; and wherein said controlling the display panel to operate in the display mode where the display panel operates at different frequencies further comprises:

controlling the one common driving circuit to provide, at a third frequency, an enable signal to each of the gate of the one second transistor in the first pixel circuit and the gate of the one second transistor in the second pixel circuit, wherein the third frequency is equal to a higher one of the first frequency and the second frequency.

15. The method according to claim 14, wherein the at least one second transistor comprises a data writing transistor coupled to the first electrode of the driving transistor, and the at least one common driving circuit comprises a first common driving circuit, wherein a gate of the data writing transistor in the first pixel circuit and the gate of the data writing transistor in the second pixel circuit are both coupled to the first common driving circuit, wherein the display mode comprises a first operating mode where an image refresh frequency in the first display area is smaller than an image refresh frequency in the second display area;

wherein said controlling the display panel to operate in the display mode where the display panel operates at different frequencies comprises:

controlling the first frequency to be smaller than the second frequency and controlling the third frequency to be equal to the second frequency in such a manner that the display panel is controlled to operate in the first operating mode; and wherein said controlling the display panel to operate in the first operating mode comprises:

controlling the first common driving circuit to provide, at the third frequency, an enable signal to a gate of the data writing transistor in one of the first pixel circuits, and simultaneously, controlling the first common driving circuit to provide, at the third frequency, an enable signal to a gate of the data writing transistor in one of the second pixel circuits.

16. The method according to claim 15, wherein in the first operating mode, an operating cycle of the first pixel circuit comprises a writing frame and a holding frame; and wherein said controlling the first common driving circuit to provide, at the third frequency, the enable signal to the gate of the data writing transistor in the one of the first pixel circuits comprises:

during the writing frame, turning on the data writing transistor in the one of the first pixel circuits to write a data signal to the gate of the driving transistor; and during the holding frame, turning on the data writing transistor in the one of the first pixel circuits to write a bias adjusting signal to the first electrode of the driving transistor, to adjust a bias state of the driving transistor.

17. A display panel, comprising:

light-emitting elements located in a display area;

pixel circuits located in the display area, each of the pixel circuits comprising a driving transistor, a threshold voltage compensation transistor, a gate reset transistor, and a bias adjusting transistor, wherein a first electrode of the driving transistor is electrically connected to the bias adjusting transistor, a second electrode of the driving transistor is electrically connected to a corresponding one of the light-emitting elements and a first electrode of the threshold voltage compensation transistor, and a gate of the driving transistor is electrically connected to the gate reset transistor and a second electrode of the threshold voltage compensation transistor;

a first driving circuit;

a second driving circuit; and a common driving circuit, wherein the display area comprises a first display area and a second display area, the light- emitting elements comprises first light-emitting elements located in the first display area and second light-emitting elements located in the second display area, and the pixel circuits comprise first pixel circuits electrically connected to the first light-emitting elements and second pixel circuits electrically connected to the second light-emitting elements, and gates of the threshold voltage compensation transistors and gates of the gate reset transistors in the first pixel circuits are connected to the first driving circuit, gates of the threshold voltage compensation transistors and gates of the gate reset transistors in the second pixel circuits are connected to the second driving circuit, and gates of the bias adjusting transistors in both the first pixel circuits and the second pixel circuits are connected to the common driving circuit;

wherein when the gate reset transistor in the first pixel circuit is turned on, the gate reset transistor in the second pixel circuit is also turned on, and when the threshold voltage compensation transistor in the first pixel circuit is turned on, the threshold voltage compensation transistor in the second pixel circuit is also turned on.

18. The display panel according to claim 17, wherein the first driving circuit comprises a plurality of cascaded first shift registers, the second driving circuit comprises a plurality of cascaded second shift registers, and the common driving circuit comprises a plurality of cascaded third shift registers, in a first pixel circuit of the first pixel circuits, the gate of the gate reset transistor is connected to an n-th stage first shift register of the first driving circuit, the gate of the threshold voltage compensation transistor is connected to an (n+1)-th stage first shift register of the first driving circuit, and the gate of the bias adjusting transistor is connected to one of the third shift registers, where n is a positive integer, and in a second pixel circuit of the second pixel circuits, the gate of the gate reset transistor is connected to an m-th stage second shift register of the second driving circuit, the gate of the threshold voltage compensation transistor is connected to an (m+1)-th stage second shift register of the second driving circuit, and the gate of the bias adjusting transistor is connected to another one of the third shift registers, where m is a positive integer.

19. The display panel according to claim 18, wherein a frequency of an enable signal provided by each third shift register is greater than a frequency of an enable signal provided by each first driving circuit, and is equal to a frequency of an enable signal provided by each second shift register.

20. The display panel according to claim 17, wherein each pixel circuit further comprises a data writing transistor, a first light-emitting control transistor, and a second light-emitting control transistor, the data writing transistor is connected between the first electrode of the driving transistor and a data signal terminal, the first light-emitting control transistor is connected between the first electrode of the driving transistor and a positive power supply signal terminal, and the second light-emitting control transistor is connected between the second electrode of the driving transistor and the corresponding light-emitting element.

* * * * *